United States Patent [19]
Benner et al.

[11] Patent Number: 5,935,216
[45] Date of Patent: Aug. 10, 1999

[54] METHODS FOR OPERATING PARALLEL COMPUTING SYSTEMS EMPLOYING SEQUENCED COMMUNICATIONS

[75] Inventors: Robert E. Benner; John L. Gustafson; Gary R. Montry, all of Albuquerque, N.Mex.

[73] Assignee: Sandia Corporation, Albuquerque, N.Mex.

[21] Appl. No.: 07/748,736

[22] Filed: Aug. 22, 1991

Related U.S. Application Data

[62] Division of application No. 07/317,389, Mar. 1, 1989, Pat. No. 5,072,371.

[51] Int. Cl.⁶ .................................................. G06F 15/163
[52] U.S. Cl. ............................................. 709/248; 712/17
[58] Field of Search ............................... 364/200 MS File, 364/900 MS File; 395/200, 800, 800.16, 800.17, 200.31, 200.78

[56] References Cited

U.S. PATENT DOCUMENTS

| | | | |
|---|---|---|---|
| 4,247,892 | 1/1981 | Lawrence | 364/200 |
| 4,720,280 | 1/1988 | Dolecek | 395/800 |
| 4,884,193 | 11/1989 | Lang | 395/800 |
| 4,891,787 | 1/1990 | Gifford | 364/900 |
| 4,918,617 | 4/1990 | Hammerstrom et al. | 364/200 |
| 4,922,418 | 5/1990 | Dolecek | 364/200 |
| 4,952,930 | 8/1990 | Franaszek et al. | 340/825.8 |
| 4,964,032 | 10/1990 | Smith | 364/200 |
| 4,983,962 | 1/1991 | Hammerstrom | 340/825.02 |
| 5,021,947 | 6/1991 | Campbell et al. | 364/200 |
| 5,050,065 | 9/1991 | Dartois et al. | 364/200 |
| 5,101,480 | 3/1992 | Shin et al. | 395/325 |
| 5,113,523 | 5/1992 | Colley et al. | 395/800 |

*Primary Examiner*—William M. Treat
*Attorney, Agent, or Firm*—Timothy D. Stanley

[57] ABSTRACT

A parallel computing system and method having improved performance where a program is concurrently run on a plurality of nodes for reducing total processing time, each node having a processor, a memory, and a predetermined number of communication channels connected to the node and independently connected directly to other nodes. The present invention improves performance of performance of the parallel computing system by providing a system which can provide efficient communication between the processors and between the system and input and output devices. A method is also disclosed which can locate defective nodes with the computing system.

23 Claims, 8 Drawing Sheets

Time →

METHODS FOR OPERATING PARALLEL COMPUTING SYSTEMS EMPLOYING SEQUENCED COMMUNICATIONS

This application is a DIVISIONAL application of Ser. No. 317,389, filed Mar. 1, 1989, now U.S. Pat. No. 5,072,371, entitled "A Method for Simultaneous Overlapped Communications Between Neighboring Processors in a Multiple-Instruction, Multiple-Data (MIMD) Computing System.

This invention relates to Computer-implemented methods of highly efficient parallel computing systems. The U.S. Government has rights in this invention pursuant to Contract No. DE-AC 04-76DP00789 between the Department of Energy and AT&T Technologies, Inc.

BACKGROUND OF THE INVENTION

There has been considerable skepticism regarding the viability of massive parallelism. The skepticism centers around Amdahl's law, an argument put forth by Gene Amdahl in 1967 ("Validity of the Single Processor Approach to Achieving Large-Scale Capabilities," AFIPS Conference Proceedings 30, 483–485) that for a program with serial work fraction s, the maximum parallel speedup obtainable is bounded by 1/s. This law has led to the assertion that the serial fraction will dominate execution time for any large parallel ensemble of processors, limiting the advantages of the parallel approach.

In the operation of programs, many sequential steps in addition to those in their kernel algorithms are used. These include the steps to obtain parameters, set up the computation, load the program into the machine, gather the result, and create displays. In a parallel system, steps are also included for sending and receiving messages between the processors. The total time of these communications between the processors adds to the communication time of the program. Although kernel algorithms can be sped up proportionately with more processors, prior to the present invention, there has not been a parallel computing system or method in which such programs systems could be used in a manner permitting significant speedup.

SUMMARY

It is an object of the present invention to provide a parallel processing system which approaches the ideal speedup theoretically possible by parallel processing.

It is also an object of the invention to provide a parallel processing system which provides efficient communication between the processors, and provides efficient communication between the system and input and output devices.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a method of operating a computing system where a program is concurrently run on a plurality of nodes for reducing total processing time for said program; each node having a processor, a memory, and a communication channel connected to each node and independently connected to a predetermined number of other nodes; the method including the steps of assigning groups of adjacent nodes, each group having communication channels from a central node to four adjacent nodes in up, down, left, and right directions, respectively, each node being capable of being a central node in a different group; exchanging messages for each node; and simultaneously communicating messages between adjacent nodes by first sending write messages from each central node sequentially to nodes in the up, down, left and right directions, and then by sequentially receiving read messages from nodes in the down, up, right and left directions.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

The parallel processing speedup of the present invention is achieved by several principles that minimize the communication time experienced by each processor. The assignment of work to each processor is allocated in a specific manner, and dynamic reconfiguration or load-balancing is avoided. The exchange of data between neighboring processors or nodes is carried out simultaneously throughout the machine. Each processor initiates communications with its neighbor in batches in a manner which permits a high degree of overlap. It has been determined that communications can be completed in about one-third of the sum of the individual message transmission time. Whenever possible, items of data are combined together into a single message. Also, time to load and broadcast identical information to all nodes is greatly reduced by the use of a fanout procedure, namely, a first node sends the information to all its nearest nodes, which in turn, relays the message to its nearest nodes, and so on.

The present invention can achieve fixed-sized speedup of over 500 on a 1024 processor hypercube and it can achieve a scaled speedup of over 1000.

The present invention demonstrates that an assumption underlying Amdahl's argument may not be valid, especially for large parallel ensembles, such as a 1024-processor system, thus, is a tremendous advance in the art.

For example, if P is the number of processors, s is the amount of time spent (by a serial processor) on serial parts of the program, and p is the amount of work spent (by a serial processor) on parts of the program that can be done in parallel, then Amdahl's laws provides:

$$\text{Speedup} = (s + p)/(s + p/P) \quad (1)$$
$$= 1/(s + p/P)$$

where normalized total time is s+p=1. For P=1024 this is a steep function of s near s=0 (slope of approximately $-P^2$), as shown in the left graph 1 in FIG. 1

Figure 1:
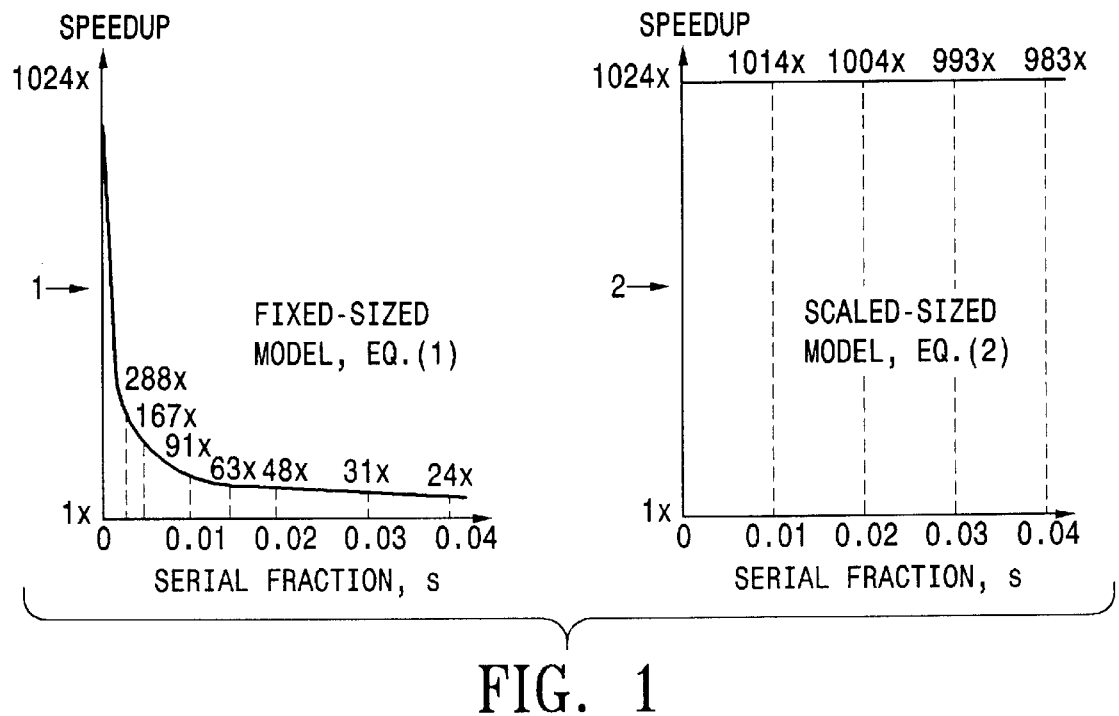
FIG. 1 shows two graphs, the left graph showing the speed of parallel processing according to Amdahl's Law and the right graph showing parallel speedup according to problem scaling.

The expression and graph in FIG. 1 are based on the implicit assumption that p is independent of P. However, a fixed sized problem is generally not simply taken and run on various numbers of processors. In practice, a scientific computing problem is scaled with the available processing power. The fixed quantity is not the problem size but rather the amount of time a user is willing to wait for an answer. When given more computing power, the user expands the problem (i.e., uses more spatial variables) to use the available hardware resources.

It has been discovered that it is the parallel part of a program which should be scaled with the problem size. Namely, the times for program loading, serial bottlenecks, and I/O that make up the s component of the application do not scale with problem size. When the number of processors is doubled, the number of spatial variables in a physical simulation is doubled. As a first approximation, the amount of work that can be done in parallel varies linearly with the number of processors.

The inverse of Amdahl's paradigm is now considered, namely; rather than ask how fast a given serial program would run on a parallel processor, ask how long a given parallel program would take to run on a serial processor. If s' and p' are used to represent serial and parallel time spent on the parallel system, s'+p'=1, then a uniprocessor requires time s'+p'P to perform the task. This reasoning gives an alternative to Amdahl's law, as follows:

$$\text{Scaled speedup} = (s' + p'P)/(s' + p') \quad (2)$$
$$= P + (1 - P)s'$$

In contrast with the curve in the left graph 1 for Equation (1) in FIG. 1, this function is simply a line of moderate slope 1-P, as shown in the right graph 2 of FIG. 1. When speedup is measured by scaling the problem size, the scalar fraction s tends to shrink as more processors are used. Thus, the present inventors have discovered that it is much easier to achieve efficient parallel performance than is implied by Amdahl's paradigm, and performance as a function of P is not necessarily bounded by an asymptote, such as that shown in the left graph 1 of FIG. 1.

The present invention is directed to new methods and applications for enhancing the performance speed of massively parallel systems. In the present specification, massive parallelism refers to general-purpose Multiple-Instruction, Multiple-Data (MIMD) systems having a large number of processors, including those having 1000 or more autonomous floating point processors, rather than Single-Instruction, Multiple-Data (SIMD) systems of one-bit processors such as the Goodyear MPP or Connection Machine.

Figure 2:
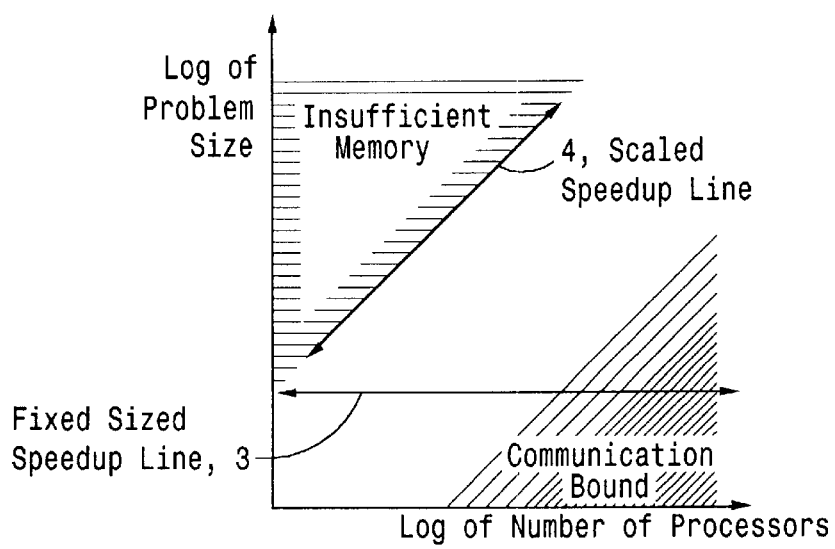
FIG. 2 is a graphic representation of an ensemble computer performance pattern.

Measurement of parallel performance car best be displayed as a function of both problem size and ensemble size. Two subsets of this domain have received attention by those skilled in the parallel computing community. The first subset, which the inventors call theft wed sized speedup line 3, is shown in FIG. 2. Along this line the problem size is held fixed and the number of processors is varied. On shared memory machines, especially those with only a few processors, this is reasonable since all processors can access memory through a network transparent to the user. On ensemble computers, fixing of the problem size can create a severe constraint, since for a large ensemble it is necessary that a problem must be run efficiently even when its variables occupy only a small fraction of available memory.

For ensemble computers the scaled speedup line 4, as shown in FIG. 2, is an alternative computational paradigm. It is the line along which problem size increases with the number of processors, as discussed above. The computation-to-communication ratio is higher for scaled problems. One can model the performance of these scaled problems with a hypothetical processor node that has direct uniprocessor access to all of the real random-access memory of the machine. This hypothetical processor performance is numerically equivalent (after adjustment by a factor discussed below) to the ratio of the measured million floating point operations per second (MFLOPS) rates. An example of these scaled speedup calculations is shown in FIG. 2

Conversion from a serial system to a parallel system often increases the operation count. For example, it might be more efficient to have each processor calculate a globally required quantity than to have one processor calculate it and then communicate it to other processors. The expression can be defined to be the operation count for the best serial algorithm, $\Omega(N)$ where N is the size of the problem in one dimension. The expression $\Omega_p(N)$ can be defined as the total operation count for the best parallel algorithm; in general, $\Omega_p(N) \geq \Omega(N)$. Also, $\Omega_1(N) \geq \Omega(N)$, where $\Omega_1(N)$ is the operation count for the parallel algorithm executed on one processor. As a result, the P processors can be 100% busy on computation and still be less than P times faster than the best serial algorithm. For example, suppose that a two-dimensional simulation requires a serial operation count given by $$\Omega(N) = a + bN + cN^2 \quad (3)$$

where a, b, and c are nonnegative integers. In running the N by N problem in parallel on P processors, each processor treats a subdomain with operation costs $\Omega(N\sqrt{/P})$. This operation cost is more work than would be performed by a serial processor:

$$\Omega_p(N) = P \cdot \Omega(P\Omega(N/\sqrt{P}) \geq \Omega(N) \quad (4)$$

Equality is only possible if a=b=0 in Equation (3).

An operation efficiency factor $\eta_p(N)$ is defined by $$\eta_p(N) = \Omega(N)\Omega_p(N) \leq 1 \quad (5)$$

where $\Omega_p(N)$ is permitted to be a general function of P. The efficiency of a particular node refers to an accounting both for the apparent efficiency (compute time divided by total time) and the operation efficiency as defined in Equation (5) above. This concept can be used to tune parallel performance by providing an analytical model of the tradeoff between communication overhead and operation inefficiency. Note that an exact floating point operation is usually required to make this measurement.

Examples of scaled speedup calculation of a parallel computer in accordance with the present invention are shown in Examples 1–3, below.

The WAVE program in Example 1 can simulate a 6144 by 6144 gridpoint domain (192 by 192 on each of 1024 processors). This large problem requires 340 MBytes for the data structures alone and cannot be run on a single processor. However, it is possible to measure interprocessor communication time and idle time on each processor to within a few thousandths of a second. If a 1024-processor job requires 10000 seconds, of which 40 seconds is the average time spent by all processors doing work that would not be done by a serial processor then one can compute an efficiency for the distributed ensemble as (10000−40)/10000=99.6%, where $\eta_p$ is unity for this application. The scaled speedup is then 0.996×1024=1020. An equivalent definition is as follows: scaled speedup is the sum of the individual processor efficiencies. The speedup shown in the graphs and tables corresponding to Example 1 below is derived this way. Alternatively, the scaled speedup can be computed as 113 MFLOPS/0.111 MFLOPS=1020.

There are practical benchmarking considerations with every speedup in parallel computing. For example, there are parameters in every system or program that affect execution times and that are user-controllable, such as the amount of output, grid resolution, or number of timesteps. Users can adjust these parameters according to their computing environment. Below, benchmarking values have been selected which are representative of production engineering activities and which include all times, both computing and overhead, associated with a job.

The limitations on execution time for fixed sized speedup can be considered as follows.

Linear speedup on 1024 processors reduces a two-minute uniprocessor execution time to 0.126 sec, which would be barely discernible to the user because of job start up time. However, a job that requires about two minutes on 1024 processors might take 30 hours on a single processor, making it tedious to benchmark. A two-minute job on 1024 processors seems to be a reasonable upper bound for a benchmark. Moreover, when using 1024 processors, it has been found that the time to complete even the most trivial computation i.e., load all processors, do one operation, and send the result back to the host) is about two seconds. Thus, in order to achieve reasonable efficiency, a job time must be selected which has at least one order of magnitude greater than this fixed overhead. Hence, as a compromise for fixed sized benchmarking, uniprocessor jobs taking 4 to 30 hours for a serial processor have been used, which results in about 20 to 200 seconds for the 1024 processor jobs. In the three examples below, the spatial discretization, number of timesteps, or convergence criteria have been chosen to approximate these times. The selections are within the limits of what an engineer or scientist would actually choose in a production environment. However, it is noted that for some applications of interest, several hours, even days, of execution time are not uncommon.

Each program provides the input and output (I/O) that would typically be demanded by someone using the program as a production design tool. Tables and input conditions are read from disk and keyboard; timestep history and final state go to both disk storage and to a color graphics display. The amount of I/O that can be demanded of a simulation is almost unbounded; the greater the demand, the more challenging it is to overlap I/O with computation. Eventually a penalty is paid, in both speedup and absolute performance. Enough I/O must be chosen in order to provide continuous interaction with the user regarding the progress of the computation, and then the solution or final timestep. For the applications discussed here, non-overlapped I/O requires less than two seconds on any job.

Figure 4:
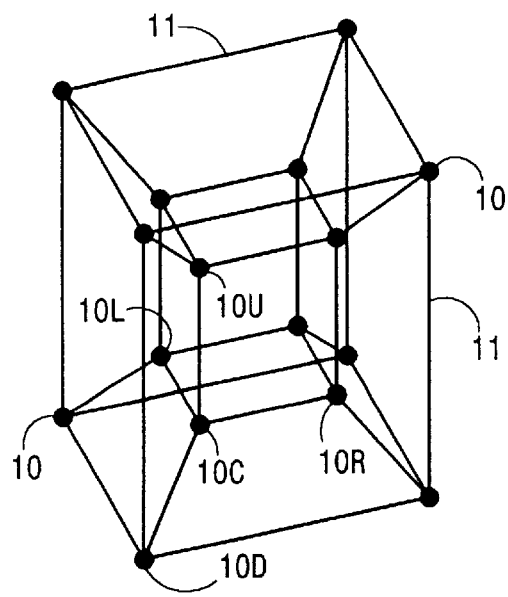
FIG. 4 is a graphic representation showing a 4 dimension hypercube structure for a parallel computer.

The present invention can be used with many digital parallel computers, including those have the processor interconnected in a butterfly, omega-network, tree, or hypercube schemes, as well as digital parallel computers where the processors are fully interconnected. The present invention is particularly suitable for massively parallel systems having a hypercube arrangement of processors. The structure shown in FIG. 4 is a representative showing of a 4 dimension hypercube.

A hypercube computer has $2^x$ nodes where the dimension x is an integer between 3 and 10, for currently available machines, and each node is independently connected to x other nodes. For this invention, a NCUBE/ten computer, a 10 dimension hypercube with 1024 processors, has been used. Since each processor has 512 KBytes of memory and a complete environment, it is possible to run a fixed sized problem of practical size on a single processor. Each NCUBE node has fast enough 32-bit and 64-bit floating point arithmetic for the 1024-node ensemble to be competitive with conventional supercomputers on an absolute performance basis.

All memory is distributed in the hypercube architecture. Information is shared between processors by explicit communications across I/0 channels (as opposed to the shared memory approach of storing data in a common memory). Therefore, the best parallel applications are those that seldom require communications which must be routed through nodes. For the present invention, these point-to-point paths have been used exclusively. The NCUBE provides adequate bandwidth for moving data to and from I/O devices such as host, disk, and graphics display. The operating system can allocate subcubes of nodes to multiple users with very little interference between subcubes. Much of the benchmarking done in the present invention was performed while sharing the cube with various sized jobs and various applications.

Each of the NCUBE nodes 10 (FIG. 4) contain a complete processor (similar in architecture to a VAX-11/780 with Floating Point Accelerator), 11 bidirectional DMA communications channels (one to each of 10 other nodes, one to I/O), and an error-correcting memory interface, all on a single chip. Both 32-bit and 64-bit IEEE floating arithmetic are integral to the chip and to the instruction set. Each node consists of the processor chip and six 1-Mbit memory chips (512 KBytes plus error correction code).

Figure 14:
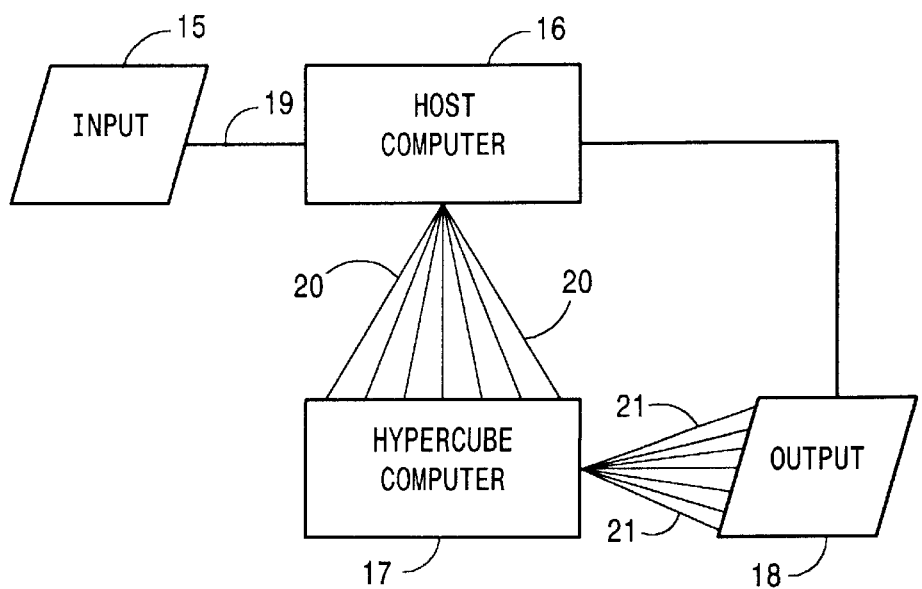
FIG. 14 is a graphic representation of a parallel computing system.

A parallel system using a hypercube is shown in FIG. 14 to include an input device 15, a host computer 16, hypercube computer 17, and an output device 18, such as a display and/or printer, interconnected by communication lines 19, 20, and 21.

Of relevance to the present invention is the ratio of computation time to communication time in such a processor node, as actually measured. Currently, a floating point operation takes between 7 and 15 $\mu$sec to execute on one node, for example, using a Fortran compiler and indexed memory-to-memory operations (peak observed floating point performance is 0.17 MFLOPS for assembly code kernels with double precision arithmetic). Computationally-intensive single-node Fortran programs fall within this range (0.07 to 0.13 MFLOPS). Integer operations are much faster, averaging a little over 1 $\mu$sec when memory references are included.

The time to move data across a communication channel can sometimes be overlapped, either with computations or with other communications. However, experience using subroutine calls from Fortran shows that a message requires about 0.35 msec to start and then continues at an effective rate of 2 $\mu$sec per byte. It is then possible to estimate just how severe of a constraint on speedup one faces when working a fixed sized problem using 1024 processors: Suppose that an application requires 400 KBytes for variables on one node (50K 64-bit words). If distributed over 1024 processors, each node will only have 50 variables in its domain. For a typical timestepping problem, each variable might involve 10 floating point operations (120 $\mu$sec) per timestep, for a total of 6 msec before data must be exchanged with neighbors. This computational granularity excludes the effective overlap of communication with computation that is achieved for larger problems. Data exchange might involve four reads and four write of 80 bytes each, for a worst-case time of (4+4)×(350+80×2) $\mu$sec, or about 4 msec. Therefore, when a single-node problem is distributed on the entire 1024-processor ensemble, the parallel overhead on the NCUBE will be about 40%. This estimate is validated by the experimental results in the examples below. The cost of synchronization and load imbalance appears secondary to that of message transfers (for interprocessor communications and I/O) for the three applications discussed herein in the examples below.

Even when the computation appears perfectly load balanced on the ensemble, there can be load imbalance caused by data-dependent differences in arithmetic times on each node. For example, the NCUBE processor does not take a fixed amount of time for a floating point addition. The operands are shifted to line up their binary points at a maximum speed of two bits per clock prior to the actual addition, or normalized at a similar rate if the sum yields a number smaller than the operands. The sum of 3.14 and 3.15 executes at maximum speed, but the sum of 3.14 and 0.0003, or 3.14 and −3.15, takes additional cycles. The microprocessor also does a check, in parallel, of whether either operand is zero, and shortcuts the calculation if true. This timing variability is typical of the VAX-type architectures, but is very unlike that of machines like the CRAY that have pipelined arithmetic. Statistically, the NCUBE nodes have nearly the same amount of work to do; however, variation caused by data introduces a slight load imbalance in the large jobs.

The communications channels for each node are, in principle, capable of operating concurrently with the processor itself and with each other, up to the point where memory bus bandwidth (7.5 MByte/sec) is saturated. However, the Direct Memory Access (DMA) channels are managed by software running on the processor. The software creates overhead that limits the extent to which communications can be overlapped.

Figure 3:
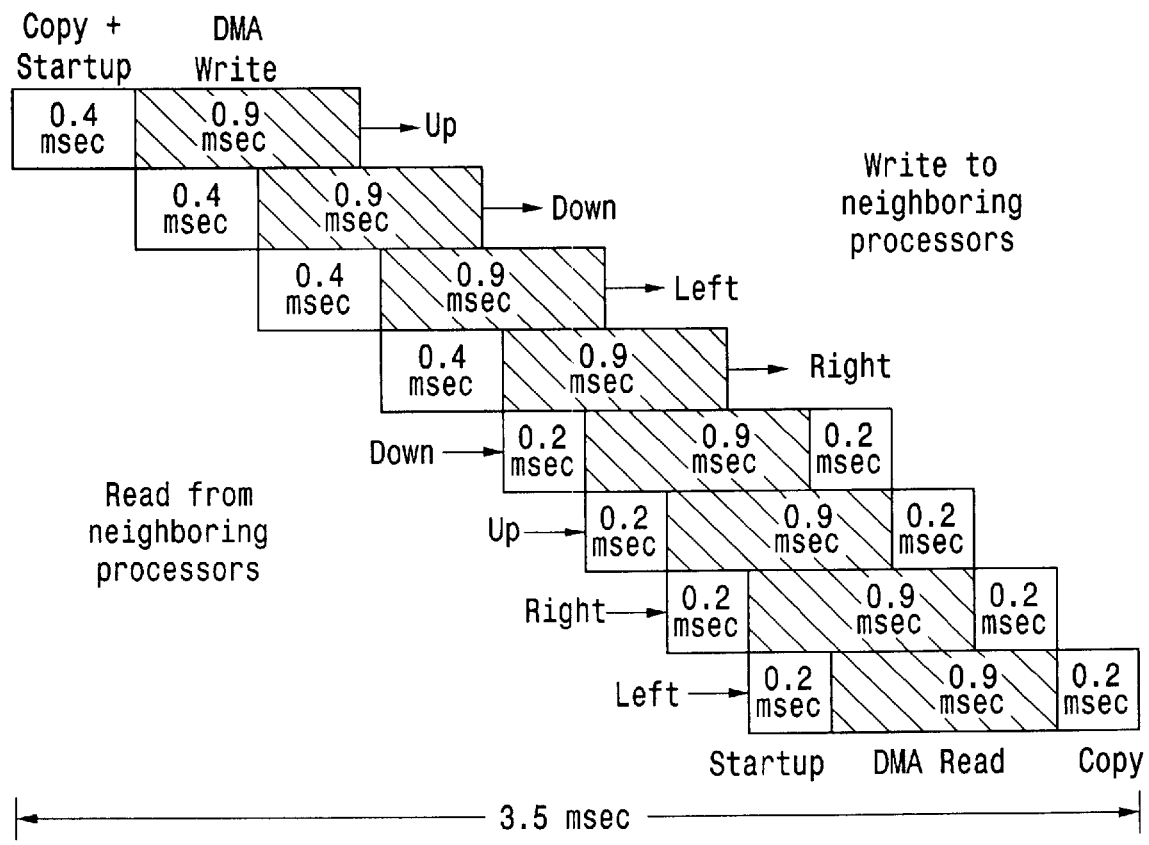
FIG. 3 shows use of overlap communication in accordance with the present invention.

A significant advance of this invention is the realization that careful ordering of reads and writes can yield considerable overlap and economy, halving the time spent on interprocessor communication. As an example, FIG. 3 shows the pattern used for the two-dimensional Wave Mechanics problem of Example 1. The other examples use similar techniques for nearest-neighbor communication in two dimensions.

The messages in FIG. 3 sent and received by each node are 768 bytes long. The actual DMA transfers require 1.20 $\mu$sec per byte, or 0.9 msec for each message. Before a message can be written, it is first copied to a location in system buffer memory where messages are stored in a linked-list format. For a 768-byte message, the copy and startup time for writing a message is about 0.4 msec. Traditional ordering of reads and writes at any node has been in alternate fashion; i.e., a node writes a message to a neighboring node and then receives a message from another node. However, it has been found best to arrange the writes as in FIG. 3, rather than as alternate writes and reads. This arrangement reduces the number of synchronization from four to one; it also ensures, as much as possible, that messages have arrived by the time the corresponding reads are executed.

Referring again to FIG. 4, one node is arbitrarily identified as central node 10C. It is directly connected in a direction arbitrarily identified as "down" to a node 10D, in a direction arbitrary identified as "up" to a node 10U, in a direction arbitrarily identified as "left" to a node 10L, and in a direction arbitrarily identified as "right" to a node 10R. Each node 10L, 10U, 10R, and 10D may also be considered to a central node for a group of 4 nodes connected to it. For example, to node 10U, node 10C is "down". Although the principal is disclosed on the 4 dimensional hypercube of FIG. 4, it should be understood that it is equally applicable to the 10 dimensional hypercube as calculated data is being transferred to four of the ten nodes connected to each node.

The "up-down-left-right" communication pattern outlined in FIG. 3 is used, as described below, in computations of two dimensional spatial grids. In three dimensional computations, an additional pair of communication directions, "up-down-left-right-front-back", are used to write messages, and "down-up-right-left-back-front" are used to read messages. In this latter case, calculated data is transferred to six of the ten nodes connected to each node. The technique can be extended to additional dimensions as desired.

When subroutine calls to read messages are issued in the same order that corresponding messages are written, the probability of an idle state (waiting for message) is reduced. Therefore, if the first write is in the "up" direction, the first read should be from the "down" direction (e.g., the node in the "down" direction (10D) from the central node (10C) wrote its first message "up" (towards 10C)). About 0.2 msec of processor time is needed to prepare to receive the message. If there is no waiting (i.e., all connected processors are ready to write), and there is little contention for the memory bus, then the read operations proceed with overlapped DMA transfers. As shown in FIG. 3, four channels can operate simultaneously for modest message lengths even when startup overhead is taken into account. In FIG. 3, an average of 2.5 DMA channels are operating simultaneously.

After each message is read into a system buffer, it is copied back to the Fortran array so it can again be used in the program. For the 768-byte message, this requires about 0.2 msec. The total time for a complete set of four writes and four reads is less than 4 msec for this example. This time compares with a computation time of about 3 seconds for the interior points. Thus, with careful management, computation time can be made almost three orders of magnitude greater than parallel communication overhead.

It is also noteworthy that the total transfer in FIG. 3 is 6144 bytes in 3.5 msec, or 0.6 μsec/byte. Because of overlap, this is less than the theoretical time required to send 6144 bytes over one channel, namely, 7.3 msec. Hence, simple parametric models of communication speed can not be used to accurately predict ensemble performance.

The present invention also saves communication time and thereby speeds up parallel computing performance by using an message organization procedure.

Considerable communication time can be saved by judicious reorganization of data and computation within the application. In particular, it is very important to avoid message startup time by coalescing individual messages wherever possible. The total overhead for every message is about 0.35 msec, which limits the fine-grained parallel capability of the hypercube. In spreading problems thinly across processors for the purpose of measuring fixed sized problem speedup, message startup time dominates the parallel overhead. To mitigate this effect, the present invention structures communications so that they are grouped rather than alternated with computation data structures were organized, so that successive communications can be changed into a single communication of concatenated data.

As an example, the first attempt at a hypercube version of the fluid dynamics program of Example 2, below, descended from a vector uniprocessor version, and required over 400 nearest-neighbor read-write message pairs per timestep. Reorganization of data structures and computation reduced the nearest-neighbor communication cost to 48 message pairs per timestep. This reduction primarily involved the reorganization of dependent variable arrays into one large structure with one more dimension.

Figure 5:
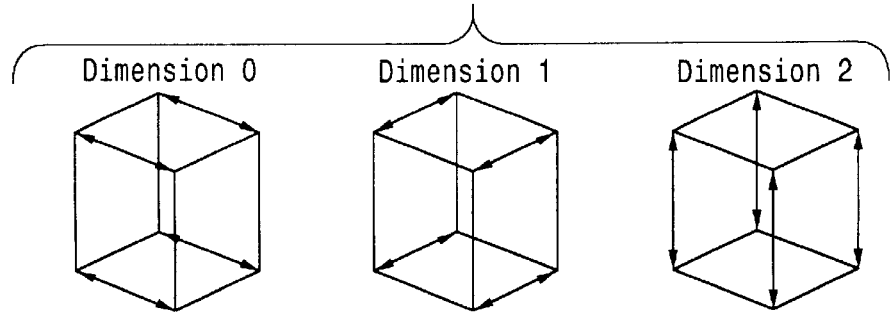
FIG. 5 is a graphic representation of global exchange for inner products as used in the present invention.

The use of global exchange can reduce the amount of parallel overhead. Many of the kernels generally thought of as "serial" (order P time complexity for P processors) can actually be performed in $\log_2 P$ time using a series of exchanges across the dimensions of the cube. For example, the accumulation of inner products is performed efficiently by means of bidirectional exchanges of values along successive dimensions of the hypercube, interspersed with summation of the newly-acquired values. See FIG. 5. This procedure requires the optimal number of communication steps, $\log_2 P$. It is noted that a "global collapse" which condenses the desired scalar to one processor which must then be broadcast to all nodes is not performed. The global exchange in the present invention does more computations and messages than a collapse, but requires half the passes to produce the desired sum on each processor. A similar pattern can be used to perform such "serial" operations as finding global maxima, global minima, and global sums, in time proportional to $\log_2 P$ rather than P.

This technique is used, for example, in the conjugate gradient iterations in the structural analysis problem to perform inner products, and in the fluid dynamics problem to establish the maximum timestep that satisfies the Courant-Friedrich-Lewy (CFL) condition. For the structural analysis problem, the time to accomplish the pattern shown in FIG. 5 for a 10-dimensional hypercube is 7.7 msec, consistent with the discussion above with respect to FIG. 3 (10 reads, 10 writes, 0.35 msec startup per read or write).

The use of a logarithm-cost fanout also assists in increasing speedup of the parallel computing.

Figure 6:
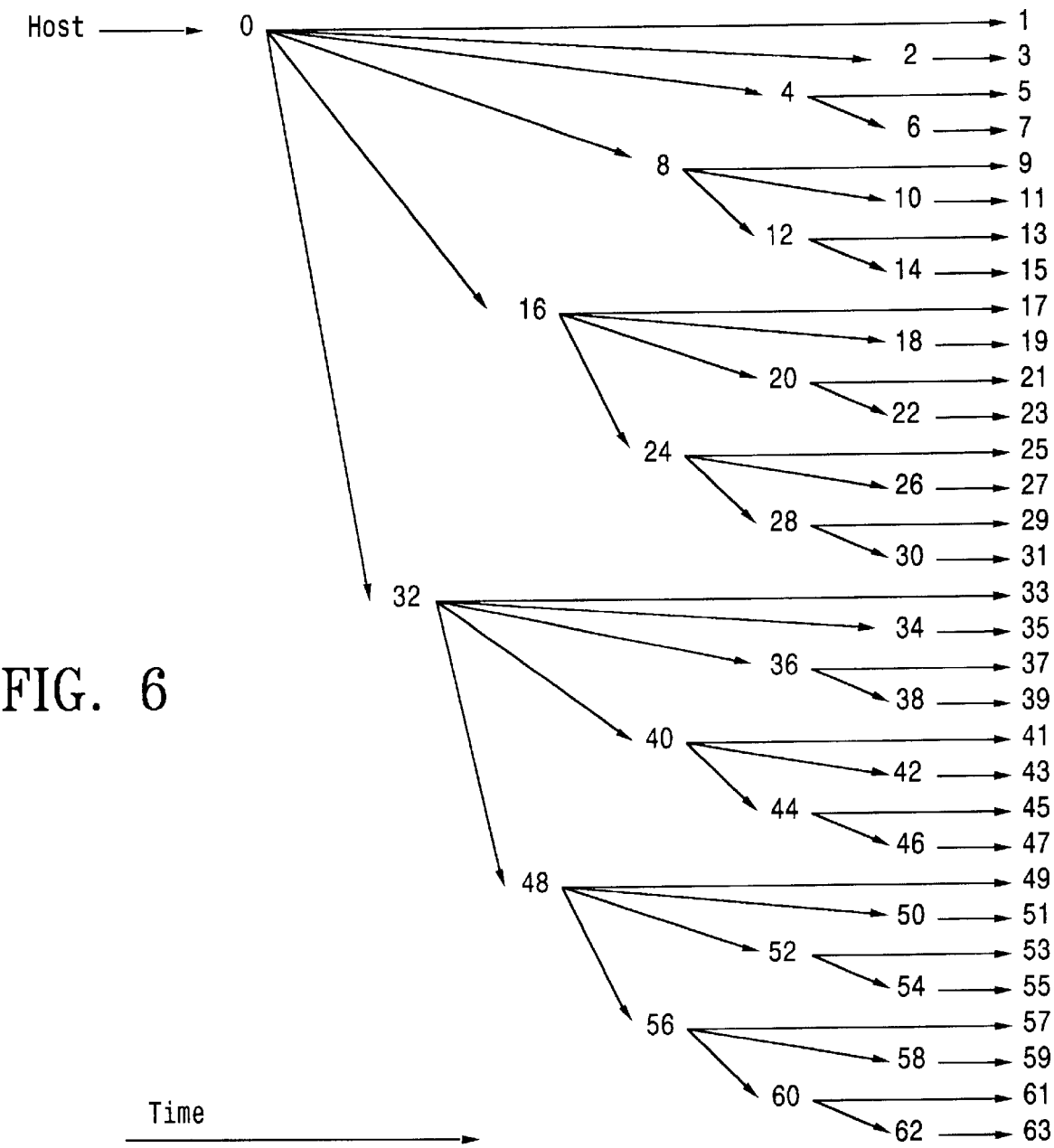
FIG. 6 is a graphic representation illustrating the fanout procedure for loading 64 processors in accordance with the present invention.

FIG. 6 shows the fanout algorithm (See "Data Communication in Hypercubes," by Y. Saad and M. H. Schultz, Report YALE U/DCS/RR-428, Yale University (1985).) used to load 64 processors in an order 6 hypercube. By using a tree to propagate redundant information the time for operations, such as loading the applications program or the node operating system, is greatly reduced. This pattern is used in reverse to collect output. In contrast with the global exchange technique discussed above, the tree method is most useful when information must be sent to or received from the host.

As an example of the savings provided by this technique, a 12500-byte executable program is loaded onto a 512-node hypercube in 1.33 seconds using a pattern similar to the one shown in FIG. 6, compared with 61.18 seconds using a serial loading technique. The performance ratio is 46 to 1. For a 1024-node hypercube, the logarithmic technique is 83 times faster. The logarithmic technique can disseminate a block of 480 KBytes (the maximum user space in each node) in less than one minute, whereas the serial technique requires an hour and twenty minutes.

Figure 15:
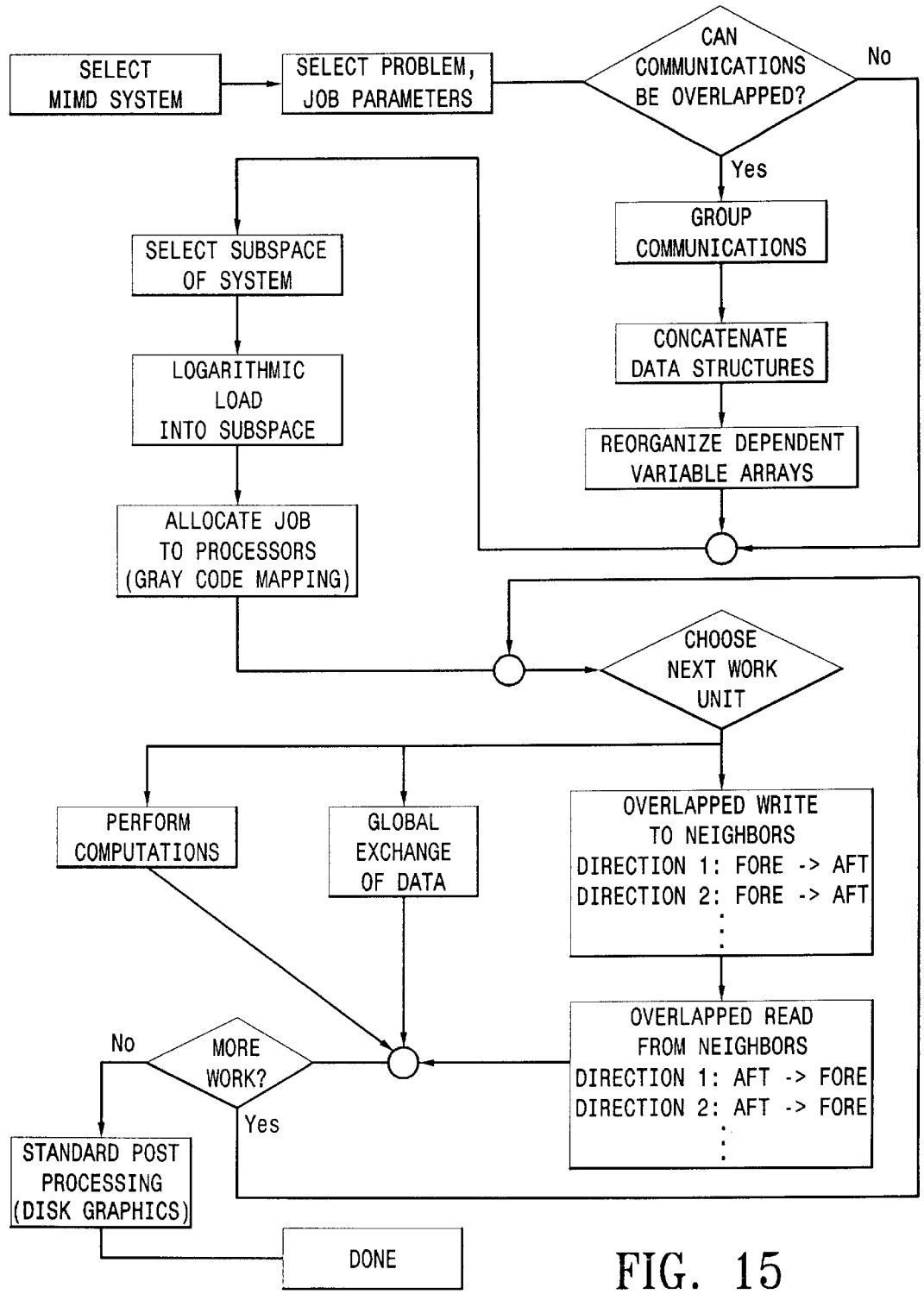
FIG. 15 is a flow chart of the method of improved parallel processing of the invention.

A flow chart of the generalized process encompassing the principles that minimize the parallel processing communication time disclosed herein are shown in FIG. 15.

EXAMPLE 1

This example is directed a WAVE program which calculates the progress of a two-dimensional surface (acoustic) wave through a set of deflectors, and provides a graphic display of the resulting heavily-diffracted wavefront. The program is capable of handling reflectors of any shape (within the resolution of the discretized domain).

The Wave Equation is $$C^2 \nabla^2 \phi = \phi_{tt} \qquad (6)$$

where $\phi$ and c are functions of the spatial variables. In general, $\phi$ represents the deviation of the medium from some equilibrium (pressure, height, etc.) and c is the speed of wave propagation in the medium (assumed to be isotropic). For nonlinear waves, c is also a function of the wave state.

A discrete form of Equation (6) for a two-dimensional problem on [0,1]x [0,1] is:

$$c^2[F(i,j+1)+F(i,j-1)+F(i+1,j)+F(i-1,j)-4F(i,j)]/h^2=[F_{new}(i,j)-2F(i,j)+F_{old}(i,j)]/(\Delta t)^2 \qquad (7)$$

where $F(i, j)=\phi(ih, jh)$, $h=1/N$. Eq. (7) can be rearranged into a scheme where $F_{new}$ is computed explicitly from F and $F_{old}$. Hence, only two timesteps need to be maintained in memory simultaneously ("leapfrog" method).

There is ample literature in the prior art regarding the convergence of this method as a function of $c^2$, h, and $\Delta t$. For example, it is necessary (but not sufficient) that $(\Delta t^2 < (h/c)^2/2$ (CFL condition). In the benchmark here constant c and $(\Delta t)^2=(h/c)^2/2$ are used.

Figure 7:
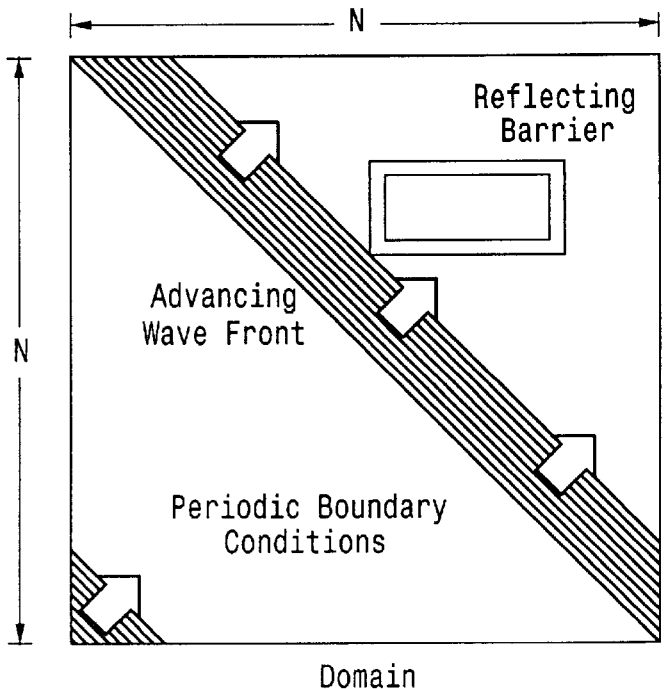
FIG. 7 is a graphic representation illustrating the dynamics of the wave mechanics application discussed in Example 1 of the present application.

To demonstrate the capability of the algorithm using the environment of the present invention, a test problem is used that included internal reflecting boundaries. This is shown in FIG. 7. The reflecting barrier is a rectangle that is one sixth by one-third the domain size. A diagonal wave of width one-sixth the domain size impinges on the barrier, creating reflections and diffractions difficult to compute by analytic means. Feature proportions of one-sixth and one-third allow discretization of size 12 by 12, 24 by 24, and so forth.

The pseudocode of algorithm a for the host program for the wave mechanics evaluation of Example 1 and algorithm A for the node program for the wave mechanics are evaluation of Example 1 are shown in APPENDIX A.

The best known parallel algorithm is computationally identical to the best known serial algorithm; one simply uses a spatial decomposition of the region. Here, $\Omega_p(N)=\Omega(N)$, so there is no need to correct for operation efficiency. The sharing of edge data provides all necessary synchronization as timesteps progress. The general approach to the wave equation on a hypercube is described by R. Clayton in "Finite Difference Solutions of the Acoustical Wave Equation on a Concurrent Processor," Caltech publication HM-89, Calf. Inst. of Tech., Pasadena (1985), and in The NCUBE Users Manual, Version 2.1, NCUBE Corporation, Beaverton, Oreg. (1987). It should be noted that there are a few specifics on the NCUBE version. The program is small enough (about 10 KBytes executable, not including data structures) to load in one long message. By using the full hypercube interconnection to load the program, even the full 1024-node jobs load in less than one second.

The equations describing communication overhead are:

$$C_p(N)=8N/P \qquad (8a)$$

$$M_p(N)=8 \qquad (8b)$$

where $C_p(N)$ is the number of bytes send and received per timestep per processor, $M_p(N)$ is the number of messages send and received per timestep per processor, N is the number of global gridpoints in the x and y directions, and P is the number of processors (P>1). For this application, the expressions for communication cost are simple because all messages are to nearest-neighbor processors in the two-dimensional topology. For the smallest problems studied (6 by 6 grid points per processor), the communication time per timestep is dominated by the 350 $\mu$sec per message startup time. The nearest-neighbor communications are described above for the largest problems studied (192 by 192 grid points per processor). The gather-scatter technique described above is essential in achieving high efficiency for fixed sized problems.

In contrast with the other two examples of applications described herein, the Wave Mechanics problem does relatively few arithmetic calculations per timestep. One consequence of this is that Fortran loop overhead dominates when the subdomains are very small. For example, the 6 by 6 subdomain initially ran at about 40 kilo floating point operations per second (KFLOPS) on a single processor, whereas the 192 by 192 subdomain ran at about 80 KFLOPS on a single processor. Besides degrading absolute performance, this overhead introduced another efficiency loss for the fixed sized case, since a 50% efficiency loss resulting from spatial decomposition had nothing to do with interprocessor communication.

To mitigate this efficiency loss, the kernel for the WAVE timestep update was coded in assembly language. This refinement raised the absolute performance while also flattening performance across the whole range of subdomain sizes. With an assembly version of step A9, the 6 by 6 problem achieved 83 KFLOPS, and larger problems quickly approach a plateau of 111 KFLOPS. Thus a 25% loss of efficiency for the fixed sized case is the result of loop startup time within a single processor, and absolute performance is improved in all cases.

We have used 32-bit precision for this application. The numerical method error is of order (h+$\Delta$t) (See "Analysis of Numerical Methods", E. Isaacson and H. B. Keller, John Wiley & Sons, New York (1966)) which dominates any errors introduced by the finite precision of the arithmetic. The parallel speedup benefits from the larger subdomains permitted by reducing memory requirements from 64-bit words to 32-bit words. Absolute performance is also increased by about 50% with virtually no additional truncation error.

The quadratic equation describing the operation count for each timestep is $$\Omega_p(N)=9N^2 \qquad (9)$$

There is no difference between $\Omega(N)$ and $\Omega_f(N)$. Since there are no terms less than second-order, the operation efficiency $\eta_p$ is unity. This ideal value for $\eta_p$ is the main reason that Wave Mechanics has the highest speedup of the applications presented here.

By keeping the number of timesteps constant, the resulting performance charts would ideally show constant MFLOPS as a function of Problem Size, and constant Time in Seconds as a function of Number of Processors. It is interesting to compare Tables 1 and 2 against this ideal Note in particular that Time in Seconds varies little with hypercube dimension, as one would hope, except for the loss in going from the serial version to the parallel version.

TABLE 1

MFLOPS for the Wave Mechanics Problem (32-Bit Arithmetic)

| Problem size | Hypercube dimension | | | | | |
|---|---|---|---|---|---|---|
| per node | 0 | 2 | 4 | 6 | 8 | 10 |
| 192 by 192 | 0.111 | 0.442 | 1.77 | 7.07 | 28.3 | 113. |
| 96 by 96 | 0.111 | 0.442 | 1.77 | 7.06 | 28.2 | 113. |
| 48 by 48 | 0.111 | 0.439 | 1.76 | 7.02 | 28.1 | 112. |
| 24 by 24 | 0.111 | 0.431 | 1.72 | 6.87 | 27.4 | 109. |
| 12 by 12 | 0.106 | 0.400 | 1.59 | 6.32 | 25.0 | 98.1 |
| 6 by 6 | 0.083 | 0.314 | 1.23 | 4.82 | 18.8 | 70.6 |

TABLE 2

Time in Seconds for the Wave Mechanics Problem

| Problem size | Hypercube dimension | | | | | |
|---|---|---|---|---|---|---|
| per node | 0 | 2 | 4 | 6 | 8 | 10 |
| 192 by 192 | 12780. | 12806. | 12809. | 12817. | 12822. | 12824. |
| 96 by 96 | 3194. | 3206. | 3206. | 3208. | 3211. | 3212. |
| 48 by 48 | 796.5 | 805.7 | 805.9 | 806.5 | 807.3 | 808.7 |
| 24 by 24 | 199.3 | 205.5 | 205.8 | 206.1 | 206.6 | 207.8 |
| 12 by 12 | 52.1 | 55.3 | 55.6 | 56.0 | 56.5 | 57.7 |
| 6 by 6 | 16.7 | 17.6 | 18.0 | 18.4 | 19.1 | 20.0 |

The physical problem being solved is identical only along diagonal lines in the above charts, from top left to bottom right. For example, the 12-by-12-per-node problem on a serial processor is the same as a 6-by-6 problem on each of four processors. In contrast, the 192-by-192-per-node problem on an 8-dimensional hypercube is the same as the 96-by-96-per-node problem on a 10-dimensional hypercube; both perform a very high resolution (3072 by 3072 global gridpoints) simulation but the algorithmic timesteps now represent a smaller interval of physical time for the high-resolution simulation than for the low-resolution simulation, since $\Delta t$ is proportional to $1/N$. By fixing the number of algorithmic timesteps, the effects of parallel overhead across rows of the table, as well as the effect of loop overhead along columns, can be studied.

Figure 8:
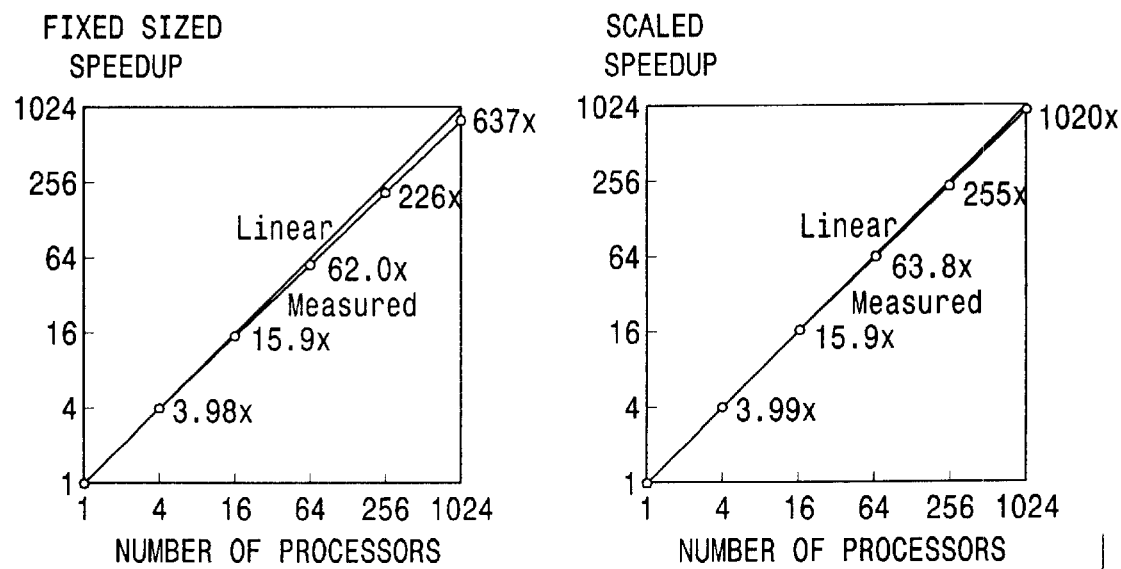
FIG. 8 is a graphic representation showing the speedup of the wave mechanics application of Example 1 in accordance with the present invention.

The job with 192 by 192 global gridpoints, the largest problem that spans the entire range of hypercube sizes, yields a fixed sized speedup of 637. If the problem is scaled to fit the processor, always assigning a 192 by 192 subdomain to each node the overall efficiency never drops below 99.6%. In particular, the 1024-node job executes 1020 times as fast as it would on one identical processor with similar access times to 0.5 GByte of memory. Alternatively, the 1024-node job executes at a MFLOPS rate of 1020 times that of a single-node job (see Table 1). Both speedup curves are shown in FIG. 8.

This application revealed a series of subtle hardware problems with specific nodes that initially caused a spurious load imbalance of up to 10% on the 256-node and 1024-node jobs. By partitioning the cube and comparing times on identical subcubes, we identified "slow nodes" that were performing memory error correction, communication error recovery, or overly frequent memory refresh, all of which diminished performance without causing incorrect results.

The fixed sized problem speedup of 637 is 62.2% of the linear speedup of 1024. Ideally, the fixed sized 12780-second serial case would have been reduced to 12.5 seconds; instead, the measured time is 20.0 seconds. Of the 7.5 second difference, 4.2 seconds is due to the reduced MFLOPS rate caused by the shortening of Fortran loop counts on each node (from 192 to 6). This MFLOPS reduction can be observed directly in the leftmost column of Table 1. Another 0.7 seconds is lost in program loading and non-overlapped I/O. The remaining time, 2.6 seconds, is lost in interprocessor communication: the sum of the latter two effects is visible in the bottom row of Table 2. The fixed sized problem speedup of 637 implies a serial fractions of 0.0006 (see Equation (1)).

The scaled problem speedup of 1020 is 99.66% of the ideal. Of the 0.34% loss. 0% is caused by operation efficiency loss, 0% is lost in loop overhead (since further improvements in serial MFLOPS were negligible beyond the 48 by 48 subdomain size: see Table 1, leftmost column), 0.01% is lost in program loading, 0.17% is incurred in going from the serial version to the parallel version of the program, and the remaining 0.16% is from load imbalance induced by data-dependent MFLOPS rates. Based on the top row of Table 2, the extrapolated uniprocessor execution time for this problem (6144 by 6144 gridpoints) is approximately 13.1 million seconds (5 months). In the terminology used above, the serial fraction s' is 0.0034, which corresponds to a serial fraction s of approximately 0.000003 (44 seconds of overhead out of 13.1 million seconds).

EXAMPLE 2

This example is directed to fluid dynamics. The solution of systems of hyperbolic equations often arises in simulations of fluid flow. One technique which has proved successful with hyperbolic fluid problems is Flux-Corrected Transport (FCT). See "A Two-Dimensional Flux-Corrected Transport Solver for Convectively Dominated Flows," by M. R Baer and R J. Gross in Sandia Report SAND 85-0613. Sandia National Laboratories, Albuquerque, N. Mex. (1986) and "Flux-Corrected Transport, I. SHASTA, a Fluid Transport Algorithm that Works," by J. P. Boris and D. L. Book in Journal of Computational Physics, 18, 38–69 (1973). Such simulations model fluid behavior that is dominated either by large gradients or by strong shocks. The particular application used here involves a nonconducting, compressible ideal gas under unstable conditions.

FCT is a numerical technique that resolves the solution of the field variables in regions of steep gradients via high-order approximations to the solution. Areas of the computational domain that exhibit large flow gradients are weighted with a second-order or fourth-order differencing scheme. The high-order differencing is to applied to preserve positivity of the field variables (for example, density remains positive).

The principles of conservation of mass, momentum and energy for a frictionless. nonconducting compressible gas are represented by the Euler equations. A precise mathematical statement of these laws is expressed in the following set of nonlinear PDE's:

Conservation of Mass $$p_t + (pu)_x + (pv)_y = 0 \tag{10}$$

Conservation of Momentum $$(pu)_t + (\wp + pu^2)_x + (puv)_y = b(x) \tag{11a}$$
$$(pv)_t + (pvu)_x + (\wp + pv^2)_y = b(y) \tag{11b}$$

Conservation of Energy $$[p(e+u^2/2+v^2/2)]_t + [pu(e+u^2/2+v^2/2+\wp/p)]_x + [pv(e+u^2/2+v^2/2+\wp/p)]_y = b(x)u + b(y)v \tag{12}$$

where the subscripts denote partial derivatives, b(x) and b(y) represent body force components, u and v are the velocity components in the x and y directions, p is the gas density, $\wp$ is the gas pressure, and e is the specific internal energy. For simplicity, the computations modeled a thermally perfect ideal gas. The gas law is given by:

$$\wp = (\gamma - 1)pe \tag{13}$$

where $\gamma$ is the constant adiabatic index. (A more complicated equation-of-state would contain more operations and improve the computation/communication ratio).

Figure 9:
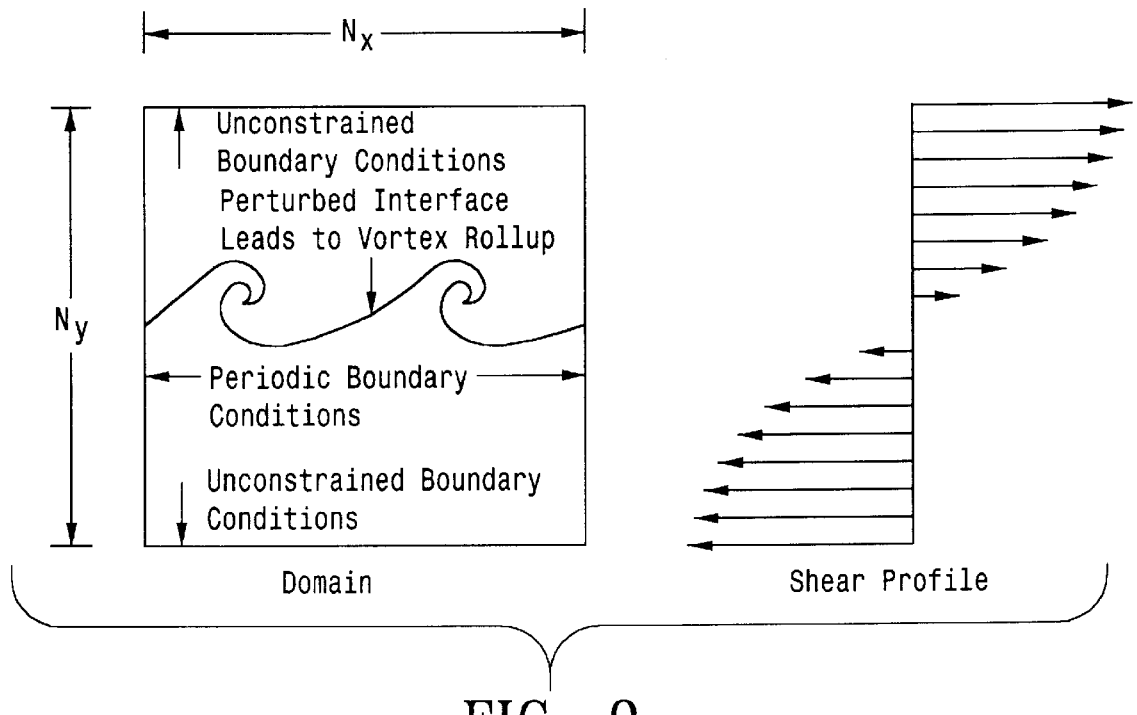
FIG. 9 is a graphic representation illustrating the fluid dynamics application discussed Example 2 of the present application.

The equations of fluid motion for a friction less, compressible gas are solved under Initial conditions which lead to a well-known Kelvin-Helmholtz instability. The domain is periodic in the x direction, and a shear flow is perturbed in order to produce vertical cells that enlarge with time (See FIG. 9). Values $N_x$ and $N_y$ refer to the spatial discretization of the domain for the numerical method described in the next section.

The pseudocode of algorithm b for the host program for the fluid dynamics evaluation of Example 2 and algorithm B for the node program for the fluid dynamics evaluation of Example 2 are shown in APPENDIX B.

There are several features of FCT which make it especially suitable for large-scale parallel processors. First, the number of operations performed at each grid cell is independent the data. Thus, processor load balance is not affected by regions with high activity, such as shocks, since the same computations are performed in the regions with low activity, or low fluid gradients. Even though these problems are nonlinear, there are no data-dependent computational decisions branches) made during the simulations.

Second, the calculations are performed over a fixed mesh. This feature permits optimally decomposing the computational grid statically, perfecting the load balance and minimizing communication costs.

Third, the nonlinear partial differential equations are solved explicitly, meaning that only data from the previous time level is needed to advance the solution to the next time step. Only a single global communication is needed per timestep in order to advance the time based on CFL condition limitations.

All of the interprocessor communications associated with the grid decomposition are nearest-neighbor only. One global communication occurs each timestep in step D4, when all processors must determine the shortest possible transit time across any cell for which they are responsible, and broadcast that time to all processors to determine the maximum allowable timestep (CFL condition). The exchange is accomplished via nearest-neighbor data exchanges along each dimension of the hypercube; thus, this global communication performed in only $\log_2 P$ time.

The equations describing communication overhead are:

$$C_p(n_x, n_y) = 736(n_x + n_y) + 24 \log_2 P \quad (14a)$$

$$M_p(n_x, n_y) = 48 + \log_2 P \quad (14b)$$

where $n_x$ and $n_y$ are the number of gridpoints per processor in the x and y directions. The $\log_2 P$ terms in Eqs. (14a) and (14b) are the result of the global exchange used to calculate the maximum timestep permitted by the CFL condition (step B4). The other terms are the result of nearest-neighbor communications, which exchange one or two strips of data between adjacent processors in all four directions on the grid.

Figure 10:
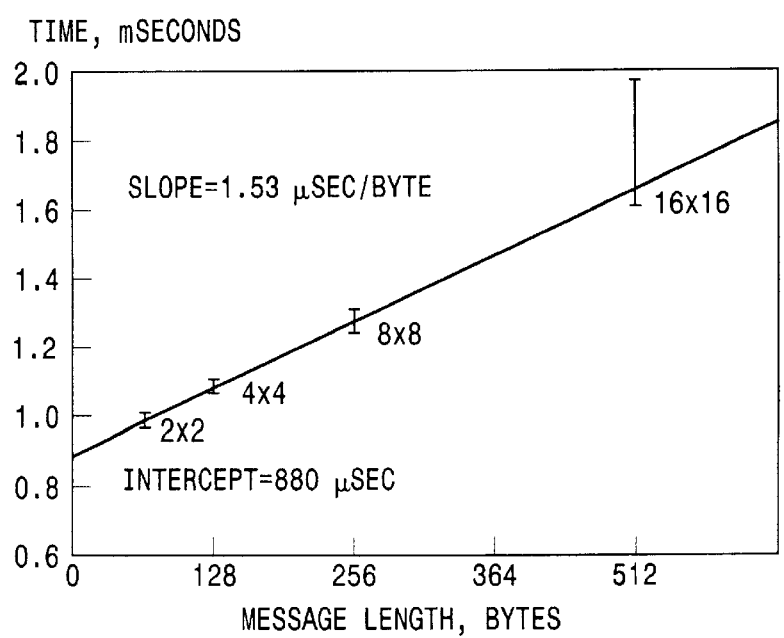
FIG. 10 is a graphic representation showing measurements for the nearest-neighbor communication times utilized in Example 2 of the present application.

FIG. 10 shows measurements for the nearest-neighbor communication times of steps B7 through B10. Measurements for the remaining nearest-neighbor communication times in steps B5 and B6 show a similar slope and intercept. Attempts to use and (14a) and (14b) to predict nearest-neighbor communication times, using the measured parameters of FIG. 10 (startup time and time per byte), predict times twice as large as measured. This discrepancy is indicative of communication overlap which would not be accounted for by the substitution of parameters into Eqs. (14a) and (14b), as explained above.

The equation describing the total operation count for each timestep is:

$$o_p(N_x, N_y) = 54P + 3P\log_2 P + 20N_x\sqrt{P} + 348N_y\sqrt{P} + 1158N_xN_y \quad (15)$$

The serial operation count is the same as the parallel operation count for one processor, i.e., $\Omega(N_x, N_y) = \Omega_1(N_x, N_y)$.

The low-order terms in Eq. (15) cause operational efficiency $\eta_p$ to be less than unity. The largest part of the operational efficiency loss is caused by $348N_y P$ term, which results from the transfer of calculations from inner loops to outer loops movement of computation from the square term (inner loop) to the linear term (outer loop) reduces the total amount of work, improving the serial processor time. The effect decreases with increasing problem size. Alternatively, by moving the computation into the inner loop, the serial performance would be degraded slightly but this would increase net speedup. When the number of processors is large, subtle programming changes can cause large fluctuations in fixed sized problem speedup.

Table 3 shows the operation efficiency for the range of problem sizes studied in the next section. These efficiencies are incorporated into the measured performance. Note that the operation efficiency loss is as large as 15%.

TABLE 3

Operation Efficiency $\eta p$ for the Fluid Dynamics Problem

| Problem size per node | Hypercube dimension | | | | | |
|---|---|---|---|---|---|---|
| | 0 | 2 | 4 | 6 | 8 | 10 |
| 64 by 64 | 1.0000 | 0.9975 | 0.9963 | 0.9957 | 0.9953 | 0.9952 |
| 32 by 32 | 1.0000 | 0.9950 | 0.9926 | 0.9913 | 0.9907 | 0.9904 |
| 16 by 16 | 1.0000 | 0.9903 | 0.9853 | 0.9829 | 0.9817 | 0.9810 |
| 8 by 8 | 1.0000 | 0.9801 | 0.9706 | 0.9657 | 0.9632 | 0.9619 |
| 4 by 4 | 1.0000 | 0.9610 | 0.9416 | 0.9323 | 0.9274 | 0.9248 |
| 2 by 2 | 1.0000 | 0.9236 | 0.8869 | 0.8684 | 0.8590 | 0.8538 |

The results are shown in Table 4 and Table 5 for 1600-timestep jobs. The fixed sized problem uses a 64 by 64 grid, with 2 by 2 points in each processor for the 1024-node case.

TABLE 4

MFLOPS for the Fluid Dynamics Problem (64-Bit Arithmetic)

| Problem size per node | Hypercube dimension | | | | | |
|---|---|---|---|---|---|---|
| | 0 | 2 | 4 | 6 | 8 | 10 |
| 64 by 64 | 0.0687 | 0.274 | 1.09 | 4.35 | 17.4 | 69.3 |
| 32 by 32 | 0.0683 | 0.272 | 1.08 | 4.33 | 17.2 | 68.8 |
| 16 by 16 | 0.0676 | 0.267 | 1.06 | 4.23 | 16.9 | 67.5 |
| 8 by 8 | 0.0663 | 0.255 | 1.01 | 4.02 | 16.0 | 63.7 |
| 4 by 4 | 0.0648 | 0.230 | 0.888 | 3.50 | 13.8 | 55.0 |
| 2 by 2 | 0.0594 | 0.167 | 0.596 | 2.30 | 9.04 | 35.6 |

TABLE 5

Time in Seconds for the Fluid Dynamics Problem

| Problem size per node | Hypercube dimension | | | | | |
|---|---|---|---|---|---|---|
| | 0 | 2 | 4 | 6 | 8 | 10 |
| 64 by 64 | 111098. | 111149. | 111433. | 111776. | 111913. | 112221. |
| 32 by 32 | 28039. | 28059. | 28068. | 28099. | 28179. | 28258. |
| 16 by 16 | 7159. | 7174. | 7180. | 7187. | 7195. | 7204. |
| 8 by 8 | 1861. | 1894. | 1893. | 1898. | 1904. | 1909. |
| 4 by 4 | 495. | 536. | 545. | 547. | 551. | 553 |
| 2 by 2 | 144. | 192. | 207. | 210. | 212. | 214. |

Figure 11:
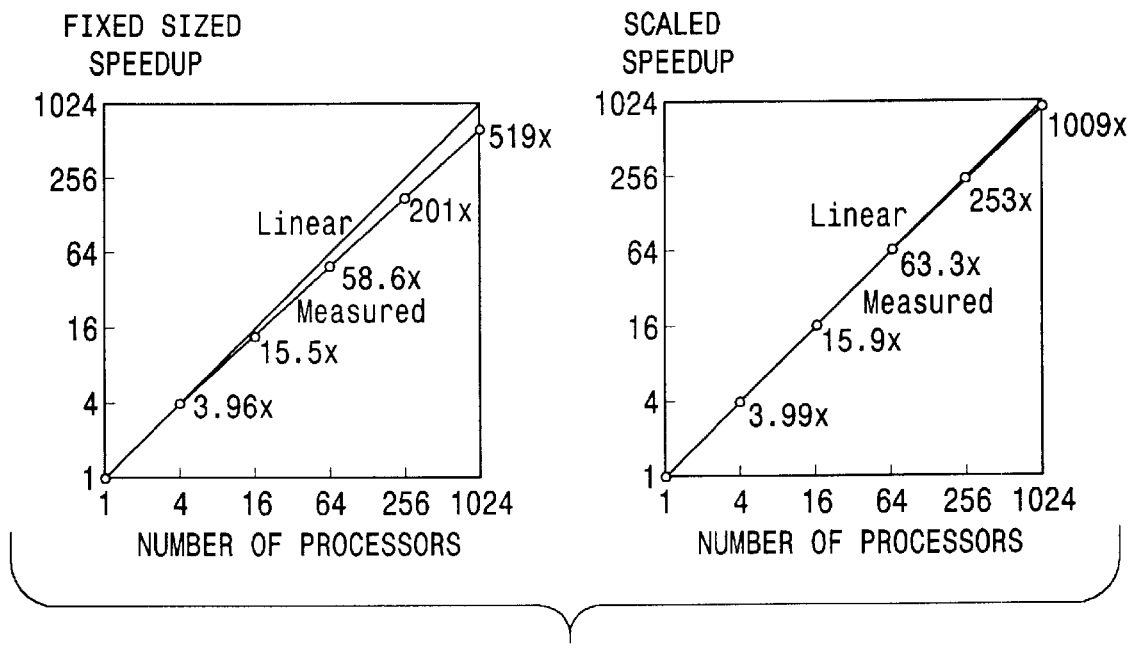
FIG. 11 is a graphical representation showing the speedup for the fluid dynamics application in connection with Example 2 of the present specification.

The fixed sized and scaled speedup curves for the FCT program are shown in FIG. 11. The fixed sized speedup of 519 is 50.7% of the ideal linear speedup of 1024. A perfect speedup would have yielded an execution time of 108 seconds, rather than the measured 214 seconds. This 106-second discrepancy is the result of four major sources of inefficiency: uniprocessor loop overhead is 17 seconds, as derived from the leftmost column of Table 3. Communication overhead in the parallel version is 66 seconds as measured by the node timers. Operation inefficiency accounts for 21 seconds, or 14.6% (cf . Table 4). Program loading, and non-overlapped I/O, which require about 2 seconds are the remaining sources of inefficiency. The fixeded sized problem speedup of 519 implies a serial fraction s of 0.001 (see Eq. (1)).

The scaled speedup of 1009 is 98.7% of the ideal. In this case, the operation efficiency is 99.5%. Communication overhead, program loading, and startup account for the remaining 0.8% loss in efficiency. Based on the top row of Table 5, the extrapolated uniprocessor execution time for this 2048-by-2048 gridpoint problem is approximately 114 million seconds (3.6 years). In the terminology used above, the serial fraction s' is 0.013, which corresponds to a serial fraction s of approximately 0.00001 (1120 seconds of overhead out of 114 million seconds.

EXAMPLE 3

In this example finite element techniques are used, for example, in structural analysis, fluid mechanics, and heat transfer applications. The particular application selected here involves the deflection of a beam subject to a specified load. This application is an established benchmark in structural mechanics, because the resulting matrix equations tend to be poorly-conditioned, which mandates the use of high-precision arithmetic and a large number of iterations to achieve convergence with standard iterative solution methods.

The differential equations of equilibrium in plane elasticity, which are used in the BEAM analysis, are discussed in "Derivation of Stiffness Matrices for Problems in Plane Elasticity by Galerkin's Methods," by B. A. Szabo and G. C. Lee in the International Journal of Numerical Methods of Engineering, 1, 301–310 (1969) with their finite element formulation. The equations can be summarized as $$\alpha u_{xx} + \beta v_{xy} + G(u_{yy} + v_{xy}) + F_x = 0 \qquad (16a)$$

$$\beta u_{xy} + \alpha v_{yy} + G(u_{xy} + v_{xx}) + F_y = 0 \qquad (16b)$$

where the subscripts denote partial derivatives, u and v represent displacement components in the x and y directions respectively, $F_x$ and $F_y$ are force components, and $\alpha$, $\beta$ and G are constitutive equation parameters. The latter can, in turn, be expressed in terms of the module of elasticity and rigidity, and Poisson's Ratio.

From the inventors' point of view, the preferred methods for solving structural analysis problems are finite elements to approximate the physical/mathematical model and Preconditioned Conjugate Gradients (PCG) to solve the resulting large, sparse set of linear equations, Ax=b. These methods are used in the solid mechanics application program JAC ["JAC—A Two-Dimensional Finite Element Computer Program for the Non-Linear Quasistatic Response of Solids with Conjugate Gradient Method," Report SANDI-0998, Sandia National Laboratories, Albuquerque, N. Mex. (1984), ]. In this program, a highly-vectorized serial production program is used on the CRAY X-MP, as well as the new, highly parallel BEAM program. Jacobi (main diagonal) preconditioning is used on both programs because it vectorizes and can be made parallel. 64-bit precision is used throughout the program; convergence is difficult without it.

The parallel BEAM program never forms and stores the stiffness matrix A in memory and hence is able to solve systems of equations several times larger than if the matrix were formed explicitly. The only place that the stiffness matrix appears in the standard PCG algorithm is in the matrix-vector product with the projection vector p. See "Matrix Computations," by G. Golub and C. Van Loan, John Hopkins University Press, Baltimore, Md. (1983). If residual and iterate vectors are denoted as b and x, respectively, then approximation of the matrix-vector product by a difference formula for the directional derivative can be expressed as:

$$Ap_k = (b(x_0 + \epsilon p_k) - b(x_0))/\epsilon \qquad (17)$$

where k is the iteration counter and e is the difference parameter. The matrix-free procedure given by Eq. (17) saves storage of A and repeated calculation of matrix-vector products. at the price of an additional residual vector calculation at each iteration.

Figure 12:
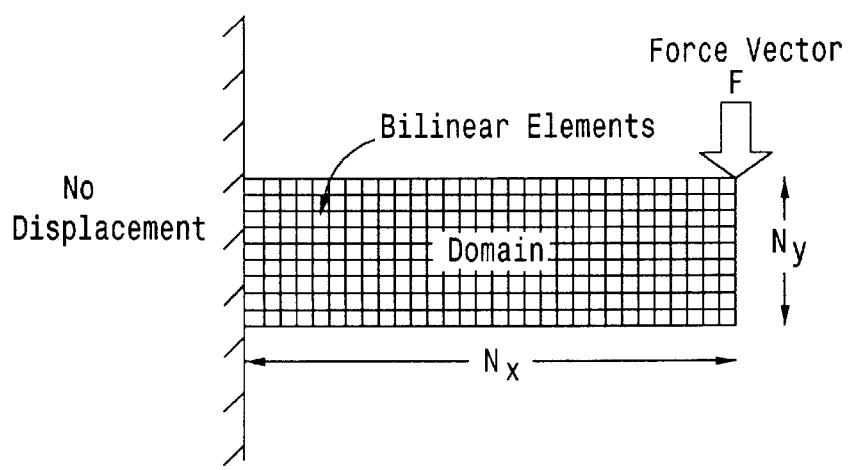
FIG. 12 is a graphic representation of the BEAM strain analysis application considered in Example 3 of the present specification.

As shown in FIG. 12, the BEAM program computes the deflection of a two dimensional beam fixed at one end, subject to a specified force, F. The beam is modeled as a linearly elastic structure with a choice of plane-strain or plane-stress constitutive equations. Values $N_x$ and $N_y$ refer to the spatial decomposition for the numerical method described above.

The pseudocode of algorithm c for the host program for the BEAM evaluation of Example 3 and that of algorithm C for the node program for the BEAM evaluation for the BEAM evaluation of Example 3 are shown in APPENDIX C.

The parallel formulation of the PCG and finite element algorithms used in BEAM is based on spatial decomposition. Each processor is assigned a rectangular subdomain within the computational domain of the beam. Each processor subdomain can, in turn, contain thousands of finite elements. The necessary synchronization during each conjugate gradient iteration are provided by three communication steps:

(1) Exchange subdomain edge values of the preconditioned residual vector z (step C9) with the four processors which are nearest neighbors on both the hypercube and the gray-coded computational domain; send boundary values of z to the nearest neighbor "down", and receive boundary values of z from the nearest neighbor "up" in the gray code decomposition; and send boundary values of z to the nearest neighbor "right", and receive boundary values of z from the nearest neighbor "left" in the gray code decomposition. This explicit sharing of data allows the matrix-vector partial product to be done locally without any further communication.

(2) Exchange and add subdomain edge values of the perturbed residual vector $b(x_0+\epsilon z)$ (step C10) with the four processors which are nearest neighbors on both the hypercube and the gray-coded computational domain. Send boundary values of $b(x_0+\epsilon z)$ to the nearest neighbor "left," and receive boundary values of $b(x_0+\epsilon z)$ from the nearest neighbor "right," and add to the $b(x_0+\epsilon z)$ boundary. Send boundary values of z to the nearest neighbor "up," and receive boundary values of z from the nearest neighbor "down," and add to the $b(x_0+\epsilon z)$ boundary.

(3) Perform global exchange and accumulation of three data items: inner products z.b, z.Az, and p.Az used in PCG iteration and convergence test (step C11).

Parallel PCG algorithms are known by those skilled in the art for the CRAY X-MP and ELXSI 6400. It is also known that the algorithm can be restructured to reduce memory and communication traffic, as well as synchronization. However, the present inventors have discovered that, by precalculating the quantity Az in place of Ap in the PCG iteration loop (step C10), the calculation of some inner products can be postponed to make possible the calculation of all inner products in an iteration in one global exchange. The potential reduction in communication time due to fewer global exchanges is 50%; reductions of about 25% are observed for small, communication-dominated problems, e.g., a total of 2048 bilinear elements on 1024 processors. The new algorithm does not increase computation time (and, therefore, serial execution time of our best serial algorithm), but does require storage of an additional vector to hold precalculated information.

The communication cost for the BEAM program is given by $$C_p(n_x, n_y) = 32(n_x + n_y) + 24 \log_2 P \qquad (18a)$$

$$M_p(n_x, n_y) = 4 + \log_2 P \qquad (18b)$$

where these equations, like those discussed above, do not account for possible overlap of messages. The $\log_2 P$ terms result from a global exchange used to calculate global inner products (step C12). The remaining terms arise from nearest neighbor communications (steps C9 and C10 ).

As shown in Table 6, rates of 132 MFLOPS are observed. The essential operation count in each pass through the iteration loop is given by $$\Omega(N_x, N_y) = 111 + 80(N_x + N_y) + 930 N_x N_y \qquad (19)$$

where $N_x$ and $N_y$ are the number of finite elements (rather than gridpoints) in the x and y directions, respectively. The actual number of operations performed in the parallel version differs from Eq. (19). To save communication, a few operations are performed redundantly on all processors so that the parallel operation count is given by $$\Omega_p(N_x, N_y) = 115P + 5P\log_2 P + 82(N_x + N_y)\sqrt{P} + 930 N_x N_y \qquad (20)$$

where P is the number of processors. (Note that unlike the previous two applications, $\Omega(N_x, N_y) \neq \Omega(N_x, N_y)$. This inequality is a consequence of exchange and addition of boundary values in step C10.) Hence, $\eta_p$ is a major source of parallel overhead. The operation efficiency $\eta_p$ is shown in Table 6.

TABLE 6

Operation Efficiency ηp for the Beam Strain Analysis Problem

| Problem size per node | Hypercube dimension | | | | | |
|---|---|---|---|---|---|---|
| | 0 | 2 | 4 | 6 | 8 | 10 |
| 64 by 32 | 1.0000 | 0.9978 | 0.9968 | 0.9963 | 0.9961 | 0.9960 |
| 32 by 16 | 1.0000 | 0.9956 | 0.9936 | 0.9926 | 0.9921 | 0.9918 |
| 16 by 8 | 1.0000 | 0.9910 | 0.9868 | 0.9848 | 0.9838 | 0.9833 |
| 8 by 4 | 1.0000 | 0.9808 | 0.9723 | 0.9683 | 0.9663 | 0.9654 |
| 4 by 2 | 1.0000 | 0.9578 | 0.9403 | 0.9322 | 0.9284 | 0.9264 |
| 2 by 1 | 1.0000 | 0.9040 | 0.8676 | 0.8518 | 0.8444 | 0.8409 |

The largest problem that fits on the full range of hypercube dimensions is the 2048 bilinear finite element discretization. This problem barely fits in one node, requiring all but a few KBytes of the 512 KByte total node storage. On 1024 processors, the memory required is only that which is necessary for two bilinear elements (about 400 bytes) plus Gaussian quadrature constants, global inner products, projection and residual vectors of the PCG iteration, and the program itself. Measurements are shown in Tables 7 and 8.

TABLE 7

MFLOPS for the Beam Strain Analysis Problem (64-Bit Arithmetic)

| Problem size per node | Hypercube dimension | | | | | |
|---|---|---|---|---|---|---|
| | 0 | 2 | 4 | 6 | 8 | 10 |
| 64 by 32 | 0.130 | 0.517 | 2.07 | 8.26 | 33.0 | 132. |
| 32 by 16 | 0.129 | 0.512 | 2.04 | 8.16 | 32.6 | 130. |
| 16 by 8 | 0.129 | 0.507 | 2.01 | 8.02 | 32.0 | 128. |
| 8 by 4 | 0.129 | 0.495 | 1.94 | 7.69 | 30.5 | 121. |
| 4 by 2 | 0.130 | 0.461 | 1.75 | 6.78 | 26.4 | 103. |
| 2 by 1 | 0.130 | 0.375 | 1.30 | 4.77 | 17.8 | 67.1 |

Job times are compared per 100 iterations for this application to allow the same kind of comparative analysis as in the previous applications: loop overhead by columns and parallel overhead by rows. The number of iterations required to converge increases approximately as $N_x$ and $N_y$. All of these calculations were run to converge, with one exception: the calculation in the upper right corner of Tables 7 and 8. This Job, with a 2048 by 1024 grid of finite elements on the full hypercube, requires more than one week to reach the converged solution. Time spent outside the iteration loop has been averaged into the results of Table 8.

TABLE 8

Time in Seconds per 100 Iterations for the Beam Strain Analysis Problem

| Problem size per node | Hypercube dimension | | | | | |
|---|---|---|---|---|---|---|
| | 0 | 2 | 4 | 6 | 8 | 10 |
| 64 by 32 | 1499.8 | 1499.6 | 1500.2 | 1500.8 | 1501.1 | 1501.7 |
| 32 by 16 | 378.4 | 379.3 | 379.9 | 380.4 | 380.9 | 381.3 |
| 16 by 8 | 95.5 | 96.4 | 97.0 | 97.5 | 97.9 | 98.4 |
| 8 by 4 | 24.3 | 25.1 | 25.6 | 26.1 | 26.5 | 27.0 |
| 4 by 2 | 6.30 | 7.07 | 7.58 | 8.02 | 8.45 | 8.88 |
| 2 by 1 | 1.73† | 2.46 | 2.97 | 3.40 | 3.84 | 4.27 |

†Result extrapolated from 30 iterations

The problem execution time drops slightly when the largest problem size is run on four processors rather than serially (Table 8, columns 1 and 2). Partitioning the problem among processors gives each processor residual equations of similar magnitude, which results in reduced floating point normalization for all problem sizes. On the largest problem size, this effect more than compensates for the additional of interprocessor communication time for the four processor case relative to the serial case. This result implies that a more computationally efficient ordering of equations for the single processor case is possible (but not necessarily practical).

The problem size is constant along the diagonals in the Tables, from top left to lower right. For example, the 64 by 32 grid of finite elements per node problem on a serial processor is the same as the 32 by 16 grid of finite elements per node problem on each of four processors. The case of a problem with a 64 by 32 grid of finite elements spans the entire range of hypercube sizes. The problem was run to convergence for better measurement of fixed speedup. The elapsed time, MFLOPS rate, number of iterations required for convergence, and fixed sized speedup are indicated in Table 9.

TABLE 9

Beam Strain Analysis Fixed Sized Problem (2048 Elements)

| Hypercube Dimension | Job Time, Seconds | Speed, MFLOPS | Number of Iterations | Fixed Speedup |
|---|---|---|---|---|
| 0 | 16278. | 0.128 | 1087 | 1.00 |
| 2 | 4097.6 | 0.508 | 1088 | 3.97 |
| 4 | 1038.8 | 2.00 | 1087 | 15.7 |
| 6 | 272.25 | 7.67 | 1087 | 59.8 |
| 8 | 80.01 | 26.4 | 1087 | 203. |
| 10 | 32.44 | 67.1 | 1088 | 502. |

Figure 13:
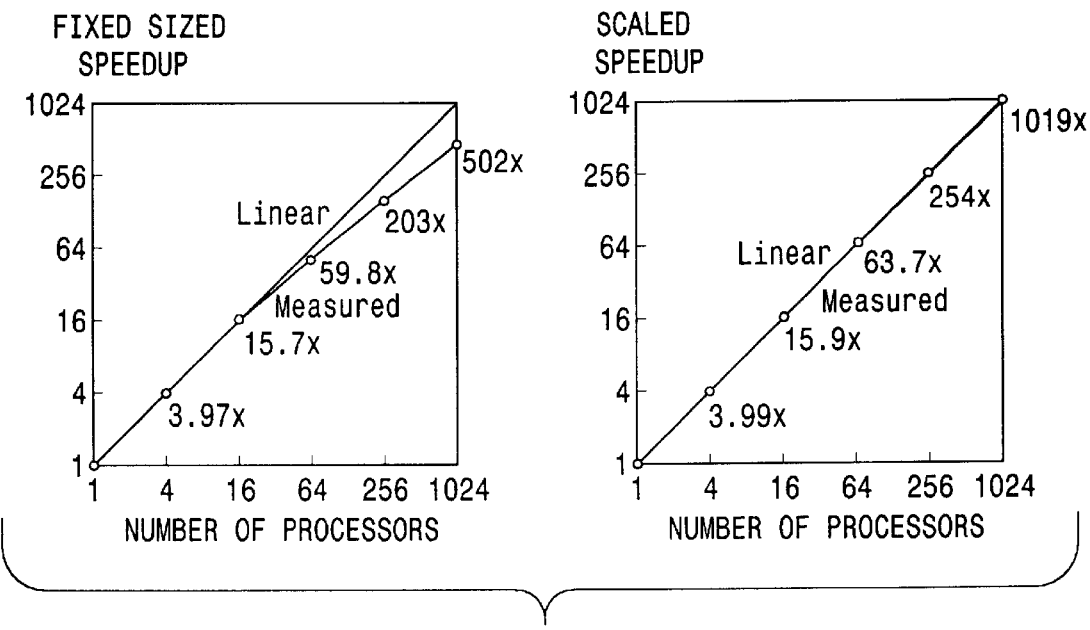
FIG. 13 is a graphic representation showing the speedup of the BEAM strain analysis in accordance with Example 3 of the present specification.

If the problem is scaled to fit the processor, with a 64 by 32 element subdomain on each node, the efficiency never drops below 99.5%. In particular, the 1024 processor job executes 1019 times as last as a single processor would if it had access to 0.5 GBytes of memory. This scaled speedup result is given by the right graph of FIG. 13.

The fixed sized speedup of 502 is 49.0 % of the ideal linear speedup. Perfect speedup would have yielded execution time of 15.9 seconds, rather than the measured 33.4 seconds. The discrepancy is the result of three sources of inefficiency: Communication overhead in the parallel version is 10.9 seconds of the total 32.4 seconds reported in Table 9. Operation inefficiency is 3.4 seconds, or 15.9% (cf. Table 6) of the 21.5 seconds of computation. Program loading and startup, which require about 2 seconds, are the remaining sources of inefficiency. Unlike the two previous applications, uniprocessor loop overhead is negligible, as shown by the leftmost column of Table 7. The MFLOPS rate changes little because most of the compute-intensive inner loops are Gaussian quadratures with loop counts that are independent of $n_x$ and $n_y$. The fixed sized problem speedup of 502 implies a serial see Eq. (1)).

The scaled speedup of 1019 is 99.5% of the ideal. In this case, the operation efficiency is 99.6%. Communication overhead, program loading, and startup account for the remaining 0.1% loss in efficiency. When taken to convergence, the accrued overhead (including operation efficiency loss) is about 3000 seconds. The extrapolated uniprocessor execution time for this problem (two million finite elements) is approximately 20 years. In the terminology used above, the serial fraction s' is 0.005, which corresponds to a serial fraction s of approximately 0.000005 (3000 seconds of overhead out of 600 million seconds).

For three important scientific applications—wave mechanics, fluid dynamics, and beam strain analysis—massively parallel solution programs have been developed using the present invention. Moreover, the algorithms appear extensible to higher levels of parallelism than the 1024-processor level shown therein. The relationship between Amdahl's fixed sized paradigm and a scaled paradigm to assess parallel performance have been examined. The scaled paradigm allows one to evaluate ensemble performance over a much broader range of problem sizes and operating conditions than does the fixed sized paradigm. For the fixed sized problems, efficiencies range between 0.49 to 0.62. For the scaled problems, efficiencies range between 0.987 to 0.996. The performance for the three applications, for both fixed sized problems and scaled problems is summarized in Table 10.

Because the applications presented here achieve parallel behavior close to ideal, subtle effects appear in the efficiency that have been relatively unimportant in the past. The previously shown procedures for parallel speedup indicate that communication cost, algorithmic load imbalance, and serial parts of algorithms have accounted for virtually all efficiency loss in parallel programs. In the present invention these effects have been reduced to the point where new ones become prominent. These new effects are potential hindrances to parallelism on larger ensembles.

TABLE 10

Performance Summary for Applications Studied

| Application | 1024-Processor Speedup | | 1024-Processor MFLOPS | |
|---|---|---|---|---|
| | Scaled | Fixed Sized | Scaled | Fixed Sized |
| Baffled Surface Wave Simulation Using Finite Differences | 1020 | 637 | 113. | 71. |
| Unstable Fluid Flow Using Flux-Corrected Transport | 1009 | 519 | 69. | 36. |
| Beam Strain Analysis Using Conjugate Gradients | 1019 | 502 | 132. | 67. |

The serial fraction s ranged from 0.0006 to 0.001 for the fixed sized problems. This is smaller than one might generally associate with a real application. However, s decreases with problem size. When the problem size is scaled with the number of processors, the serial fraction s' is 0.003 to 0.013, corresponding to an equivalent serial fraction s of 0.000003 to 0.00001. This validates the scaled problem model discussed above.

Operation efficiency, an algorithmic consideration, is the dominant term in accounting for the efficiency loss in scaled speedup measurements for two of the three applications. The factoring of efficiency into two components, processor usage efficiency and performed/required operation efficiency, has been discovered by the present inventors. Operation efficiency is an important new tool for analysis and development of highly parallel algorithms. It can be used to tune parallel performance by providing an analytical model of the tradeoff between communication overhead and redundant operations.

Subtle efficiency losses can also be caused by the hardware of massively-parallel ensembles. First, data-dependent timing for basic arithmetic is responsible for much of the load imbalance in the scaled applications. Even though each processor performs a nearly identical set of arithmetic operations (except at boundary conditions), a measured statistical skew is caused by the variation in time required for floating point operations on the current VLSI node processor. The effect is less than 1% in all cases, but becomes visible on applications such as Wave Mechanics where the algorithmic load balance is perfect.

Second, in measuring the performance on various sized subcubes, anomalies were observed. These anomalies could be reproduced, for example, on the lowest 512 processors but not the upper 512 processors. An almost-perfect efficiency was reduced to 90%–97% efficiency when the subcube in use contained certain defective processor nodes. Close examination of the nodes revealed various defects that slowed their operation without causing incorrect results: communication errors with successful retries, error corrections on memory, and hyperactive dynamic RAM refresh rates. The three applications in the examples above can serve as "slow node" diagnostics for finding and replacing defective nodes. It is unlikely that they could have served this purpose had they not been nearly 100% efficient. The statistical base of processors is large enough that anomalies in hardware performance are readily apparent; this effect will become increasingly important as processor ensembles increase in size.

It is important to note that, even when a fixed sized problem is only considered, the ensemble MFLOPS rate is equivalent to the vector MFLOPS rate of typical supercomputers. When mesh sizes are scaled up to those typical of the large PDE simulations used in scientific and engineering analysis, the result is nearly perfect (linear) speedup. This work is strong evidence of the power and future of parallel computing with large numbers of processors.

APPENDIX A

Parallel Algorithm a

Host program for the Wave Mechanics Problem of Example 3 a1. [Start] Prompt the user for the desired hypercube dimension. For simplicity, we require that the dimension can be even so that grid resolution always scales in both dimensions.

a2. [Open subcube.] Open the requested hypercube, and send a copy of the WAVE node program (Algorithm A) to all nodes using a logarithmic fanout. (Nodes begin execution and start timing their job as soon as they are loaded).

a3. [Determine problem size.] Prompt the user for the desired resolution of the discretization, and the desired number of timesteps. (The resolution can be N=6, 12, 24, 48, 96, or 192 per node; the number of timesteps should be even.) Send both parameters to every node.

a4. [Prepare the node output.] While the first timestep is being calculated, initialize the graphics display (load color table, clear screen, compute scale factors), and determine the gray code mapping of nodes to the two-dimensional domain.

a5. [Read timestep.] If the "History" flag is true, read the timestep data from each node (pixel values, 0 to 255) and display on the graphics monitor. (Sending pixels instead of floating point values saves message length and host effort.)

a6. [Next timestep.] Repeat step a5 for every timestep.

a7. [Read last timestep.] Read the final timestep data from each node and display it (regardless of the state of the "History" flag).

a8. [Read timers.] Read the timing data from every node. Find the minimum and maximum processor times, compute MFLOPS, and display on the ASCII monitor. (The computation of application MFLOPS is the only floating point arithmetic performed by the host algorithm.)

APPENDIX A (con't)

a9. Close the allocated hypercube.

Parallel Algorithm A
Node Program for the Wave Mechanics Problem of Example 1

A1. [Start timer.] Prior to any other executable statement, execute a system call to record the time.

A2. [Obtain node location.] Execute a system call to obtain this node's processor number (0 to 1023, gray code) and the dimension of the cube.

A3. [Find gray code mapping.] Use the data from step A2 to compute the processor numbers of the nearest neighbors in a two-dimensional subset of the hypercube interconnect. If n is the processor number, then half the bits in n represent x location and the other half represent the y location. The x and y node coordinates are converted from gray code to binary, incremented and decremented to obtain coordinates of nearest neighbors, and converted back to gray code to obtain the processor numbers of the four neighbors.

A4. [Read problem parameters.] Read the number of timesteps and the subdomain size from the host (step a3).

A5. [Start timesteps.] Initialize the first two timesteps $F(i,j)$ and $G(i,j)$. In the test case, a diagonal shock wave is loaded into the first timestep, and the same wave moved one unit up and to the right is loaded into the second timestep to create a non-disbursing shock; a rectangular region in the path of the wave is marked "reflecting" by setting flags $Z(i,j)=0$ there. Elsewhere, $Z(i,j)=1$.

A6. [Main loop.] Transfer the (noncontiguous) left and right "inner edges" of timestep $G(i,j)$ to dedicated contiguous buffers.

APPENDIX A (con't)

A7. [Send boundary messages.] Send all "inner edges" of G to nearest neighbors in the Up, Down, Left, and Right directions. (Boundary conditions are periodic, so processors messages "wrap around" with a toroidal topology).

A8. [Receive boundary messages.] Receive all "outer edges" of G from nearest neighbors in the Down, Up, Right, and Left directions. This interchange of Down-Up, Right-Left provides the maximum possible overlap of communications.

A9. [Update timestep.] Use the G timestep to compute a new timestep F using Equation (7), where references to spatial gridpoint neighbors such as $F(i+1,j)$ are replaced by $F(i,j)$ if $Z(i+1,j)$ is 0. Hence, points in the domain flagged by $Z(i,j)=1$ behave as perfect wave reflectors.

A10. [Send graphics data to host.] If the "history" flag is true, send the pixels representing the wave state to the host for display.

A11. [Update timestep.] Repeat steps A6 to A10, reversing the roles of F and G. This "leapfrog" technique allows the wave to be simulated with only two timesteps in memory at once.

A12. [Next timestep pair.] Repeat steps A6 to A11, for the requested number of timesteps.

A13. [Send last Upstep.] Send the pixels representing the final timestep to the host.

A14. [Stop timers.] Record time and send it to the host for performance assessment.

APPENDIX B

Parallel Algorithm b
Host Program for fluid Dynamics Problem b1. [Start.] Prompt the user for the cube dimension, x and y discretization (processors and gridpoints), number of timesteps, and the amount of output information.

b2. [Start host timers.] Initialize load timer, read timer, write timer, elapsed timer, and host timer to zero.

b3. [Start nodes.] Open the hypercube with the requested dimension. Load the FCT node program (Algorithm B) into the hypercube using a logarithmic fanout. Send problem parameters to every node using a logarithmic fanout.

b4. [Assemble processor map.] Compute the mapping of hypercube nodes to the two-dimensional domain for the purpose of sorting output from hypercube nodes. (This overlaps the node computation of the first timestep.)

b5. [Read timestep.] If the timestep was one requested as output, read the information from the hypercube nodes.

b6. [Iterate.] Repeat step b5 for every timestep.

b7. [Read node timers.] Read the node timing information after cessation of hypercube calculations.

b8. [Close hypercube.] Close the allocated array in the physical hypercube.

b9. [Stop host timers.] Stop all timers initialized in step b2.

b10. [Display timers and stop.] Write out all host and node times to requested output devices.

APPENDIX B (con't)

Parallel Algorithm B
Node Program for the Fluid Dynamics Problem of Example 2

B1. [Start timers.] Initialize all node performance timers.

B2. [Problem setup] Read input values (step b3) and generate initial values for p, pu, pv, and e.

B3. [Calculate extensive variables.] Compute the latest values of Ω, u, and v for the current time based on the values of p, pu, pv, and e.

B4. [Calculate Δt ] Calculate new timestep based on current values of the dependent variables, using a global exchange.

B5. [Communicate dependent variables.] Communicate with four neighbors the edge values for all dependent variables: p, pu, pv, and e.

B6. [Communicate extensive variables.] Communicate with four neighbors the edge values of all extensive variables: Ω, u, and v.

B7. [Advance density by Δt/2.] Calculate p and exchange two-deep edges with the four neighbors.

B8. [Advance x momentum component by Δt/2.] Calculate pu and exchange two-deep edges with the four neighbors.

B9. [Advance y momentum component by Δt/2.] Calculate pv and exchange two-deep edges with the four neighbors.

B10. [Advance specific internal energy by Δt/2.] Calculate e and exchange two-deep edges with the four neighbors.

B11. [Use half-timestep values to finish timestep.] Repeat steps B3 to B10 to advance all dependent variables from current time to current time plus Δt B12. [Send data to host.] Send graphical and tabular data to output devices as requested.

B13. [Next timestep.] Repeat steps B3 and B12 for the requested number of timesteps.

B14. [Record the time times.] Stop all timers: send times to the host, and quit.

APPENDIX C

Parallel Algorithm c
Host Program for the Beam Strain Analysis Problem of Example 3 c1. Prompt the user for input values. (Read the dimension of the cube, number of processors and finite elements in the x and y directions, and physical parameters of the beam model).

c2. Open a hypercube, and send a copy of the program (Algorithm C) to all nodes using a logarithmic fanout. (Nodes begin execution, and start timing their job, as soon as they are loaded.)

c3. Send the input values to node 0 (step C3).

c4. While the first iteration is being calculated, create the output header.

c5. Print the input values from step c1 to the output file.

c6. Collect output data from node 0 and print them in the output file. (All nodes contain copies of data resulting from global exchanges; therefore, only one node needs to send the final result to the host.) The message type indicates completion of iterations, continuation of iterations, or any of a number of failure modes.

c7. If message type indicates continuation of iterations, then repeat step c6.

c8. Close the hypercube.

Parallel Algorithm C
Node Program for the Beam Strain Analysis Problem of Example 3

C1. [Set timer.] Record the time.

C2. [Get node ID.] Execute a system call to obtain this node's processor number (0 to 1023, gray code) and the dimension of the cube.

C3. [Get job parameters.] If the processor number is 0, receive job parameters from the host (step c3). (This data is then propagated using the logarithmic fanout shown in FIG. 6)

APPENDIX C (con't)

C4. [Create 2-dimensional topology.] Use the data from C2 and C3 to compute the processor numbers of the nearest neighbors in a two-dimensional subset of the hypercube interconnect. ( This is done as described for the Wave Mechanics problem, except that $N_x$ is not necessarily equal to $N_y$).

C5. [Decompose domain.] Based on the position in the two-dimensional global domain, compute the finite element basis functions, mesh points, initial Iteration guess, $x_o$, boundary conditions, and relationships between mesh points and elements.

C6. [Start nonlinear iteration.] Set up Newton iteration: calculate residual vector b by 2-by-2-point Gaussian quadrature and save a copy of it as $b_o$.

C7. [Start linear iteration.] Set up PCG iteration: calculate and invert d, the main diagonal of the iteration matrix A. Initialize projection vector p and vector Ap to zero. Start iteration loop timer.

C8. [Start iteration loop.] Set iteration counter i to 1.

C9. [Precondition b.] Calculate z=dIb, where I is the identity matrix. Exchange boundary values of z.

C10. [Find directional derivative.] Compute "matrix-free" product Az using $b(x_o+\epsilon z)$. Compute $b(x_o+\epsilon z)$, then exchange and sum boundary values. Compute Az (see Eq. (17).)

C11. [Prepare z for inner product calculation.] Reset "left"and "up" boundary values of z to zero.

C12. [Compute inner products.] Calculate local portion of z·b, z·Az, and p·Az. Perform global exchanges to obtain global inner products.

C13. [Test for convergency.] If x·b<δ, then stop iteration loop timer and proceed with step C15. If iteration number i is a multiple of input parameter j and node number is 0. send inner products to host for monitoring progress of calculation.

APPENDIX C (con't)

C14. [Calculate projection length β]. β is z·b divided by the value of z·b from the previous iteration. Then Ap=Az+βAp and p·Ap=z·Az+2βp·Az+β²p·Ap.

C15. [Update linear solution.] Calculate a in the PCG algorithm (α=z·b/p·Ap) and update p, x, and b. (p=z+βp, x=x+αp, b=b −αAp). Increase i by 1 and go to step C9 if i is less than or equal to the maximum number of iterations (specified as a job parameter). If i exceeds that maximum, stop the iteration loop timer, send a message to the host that linear iteration failed and proceed to step C17.

C16. [Update the nonlinear solution.] If the problem is linear or the Newton Iteration has converged, send a message indicating this to the host. If the maximum number of nonlinear iterations has exceed the maximum (specified as a job parameter), send a message indicating this to the host. Otherwise, calculate a new residual vector b by Gaussian quadrature and go to step C7.

C17. [Complete node timings.] Gather step C6-C16 timing statistics by global exchanges. Stop node timer. Send complete timing statistics to the host (step c6).

We claim:

1. A method for parallel processing, comprising:
    (a) inputting data and a problem-solving algorithm for a problem to be solved by a N-dimension parallel computer using logarithmic fanout;
    (b) configuring a sufficient subspace of dimension m required to solve the problem, where m is less than or equal to N;
    (c) mapping a n-dimension spatial grid, where n is less than or equal to m, by allocating work to specific processors of the parallel computer;
    (d) opening the subspace and inputting the data, execution parameters, and the algorithm into the subspace using logarithmic fanout;
    (e) processing data according to algorithm within each processor;
    (f) writing messages to each of the selected neighboring processors paired in directions in a specified order of writing first to the neighboring processor in a fore orientation and then writing to the neighboring processor in an aft orientation such that the startup, copy, and transfer time for a subsequent message overlaps the transfer time for a previous message;
    (g) repeating step (f) until all selected neighboring processors of the n-dimensional spatial grid have been written to;
    (h) and, when at a boundary, and in the direction of a boundary where there is only one orientation, writing to only one processor associated with that orientation;
    (i) subsequently reading messages from each of the selected neighboring processors in paired directions in the same order of directions, but reading first from the neighboring processor in the aft orientation and then reading from the neighboring processor in the fore orientation such that the startup and transfer time for a subsequent message overlaps the transfer and copy time for a previous message;
    (j) repeating step (i) until all selected neighboring processors of the n-dimensional spatial grid have been read; and
    (k) and, when at a boundary, and in the direction of a boundary where there is only one orientation, reading from only one processor associated with that orientation;
    (l) outputting the solution to the problem;
    (m) closing the subspace; and
    (n) displaying the solution to the problem.

2. The method of claim 1, further comprising concatenating the messages.

3. The method of claim 1, further comprising accumulating and exchanging data among all processors of the subspace.

4. A method of organizing and communicating information in a MIMD parallel processing computer system, wherein the parallel processing computer system includes a plurality of processors interconnected with a plurality of neighboring processors, comprising:
    a) within each processor, obtaining computational results and then grouping said computational results in dependent variable arrays;
    b) organizing the dependent variable arrays into large data structures;
    c) concatenating the data structures into a single message; and
    d) communicating the single message by global exchange, whereby bi-directional communications of the single message are initiated in a specified sequential order between a processor and selected of its neighboring processors and the communications are overlapped.

5. The method of claim 4, wherein said computational results are inner products of a preconditioned conjugate gradient iteration and convergence criteria.

6. The method of claim 4, wherein the step of organizing the dependent variable arrays into large data structures adds an additional dimension to the data structure.

7. The method of claim 4, wherein the step of initiating communications of the single message in a specified sequential order comprises:
    a) writing the message to each of selected adjacent neighboring processors by writing first to a neighbor in a first orientation and then by writing to a neighbor in a second orientation; and
    b) reading messages from each of the selected adjacent, neighboring processors and the reverse order of orientations.

8. The method of claim 7, further including:
    a) repeating step a) until all selected neighboring processors have been written to; and
    b) repeating step b) until all selected neighboring processors have been read.

9. A method of increasing the efficiency of a N dimension parallel processing computer, wherein the parallel processing computer includes a plurality of processors interconnected with up to N neighboring processors, comprising:
    a) allocating data associated with a given problem to specific processors of the parallel processing computer;
    b) inputting parameters and programs into each processor with logarithmic fanout;
    c) combining items of data into a single message; and
    d) simultaneously communicating the single message between neighboring processors with a global exchange technique, whereby bidirectional communications of the single message are initiated in a specified sequential order between a processor and selected of its neighboring processors and the communications are overlapped.

10. The method of claim 9, wherein the step of initiating communications of the single message in a specified sequential order comprises:
    a) writing the message to each of selected adjacent neighboring processors by writing first to a neighbor in a first orientation and then by writing to a neighbor in a second orientation; and
    b) reading the message from each of the selected adjacent, neighboring processors in the same order of orientations.

11. The method of claim 10, further including:
    a) repeating step a) until all selected neighboring processors have been written to; and
    b) repeating step b) until all selected neighboring processors have been read.

12. A method for increasing the efficiency of a N dimension parallel processing computer, wherein the parallel processing computer includes a plurality of processors interconnected with up to N neighboring processors, comprising:
    a) allocating specific problem solving functions of a given problem to specific processors;

b) inputting parameters and programs to each processor with logarithmic fanout;

c) combining items of data into a single message; and d) simultaneously exchanging data between selected neighboring processors, whereby bidirectional communications of the exchanged data are initiated in a specified sequential order between a processor and selected of its neighboring processors; and e) overlapping processor initiated communications with neighboring processors.

13. The method of claim 12, wherein said parallel processor computing system is selected from the group consisting of: butterfly, omega-network, mesh, tree, hypercube, and digital parallel computers with fully interconnected processors.

14. The method of claim 13, wherein said hypercube is an arrangement of processors has $2^x$ nodes where x is greater than three, and each node is independently connected to x other nodes.

15. The method of claim 13, wherein the number of selected processors is less than the number of all interconnected processors.

16. The method of claim 13, where the number of selected processors is equal to the number of interconnected processors.

17. The method of claim 12, wherein allocation of specific problem solving functions to specific processors is by selecting a m dimensional subspace of the parallel processing computer sufficient to solve the given problem, where m is less than or equal to N and by determining gray code mapping for assigning portions of a n dimensional spatial grid representing the given problem to processors, where n is less than or equal to m.

18. The method of claim 17, wherein the selected m dimensional subspace is a hypercube.

19. The method of claim 12, wherein the step of initiating communications of data in a specified sequential order comprises;

a) writing messages to each of the selected neighboring processors by writing first to a neighbor in a first orientation and then writing to a neighbor in a second orientation; and b) reading messages from each of the selected neighbor processors in the same order of orientations.

20. The method of claim 19, further including:

a) repeating step a) until all selected neighboring processors have been written to; and b) repeating step b) until all selected neighboring processors have been read.

21. The method of claim 12, wherein the step of simultaneously exchanging data between neighboring processors includes exchanging and accumulating data among all processors.

22. The method of claim 12, wherein the step of combining items of data into a single message further comprises grouping communications of related computational results and organizing dependent variable arrays into a large data structure.

23. The method of claim 12, wherein the step of combining items of data into a single message further comprises concatenating data structures into a single message.

* * * * *